US008210851B2

(12) United States Patent
Wade et al.

(10) Patent No.: US 8,210,851 B2
(45) Date of Patent: Jul. 3, 2012

(54) METHOD FOR MODULATING LISTENER ATTENTION TOWARD SYNTHETIC FORMANT TRANSITION CUES IN SPEECH STIMULI FOR TRAINING

(75) Inventors: Travis W. Wade, San Francisco, CA (US); Joseph L. Hardy, Richmond, CA (US)

(73) Assignee: Posit Science Corporation, San Francisco, CA (US)

( * ) Notice: Subject to any disclaimer, the term of this patent is extended or adjusted under 35 U.S.C. 154(b) by 1334 days.

(21) Appl. No.: 11/464,590

(22) Filed: Aug. 15, 2006

(65) Prior Publication Data

US 2007/0054249 A1 Mar. 8, 2007

Related U.S. Application Data

(63) Continuation-in-part of application No. 11/032,894, filed on Jan. 11, 2005, now abandoned, which is a continuation-in-part of application No. 10/894,388, filed on Jul. 19, 2004, now abandoned.

(60) Provisional application No. 60/536,129, filed on Jan. 13, 2004, provisional application No. 60/536,112, filed on Jan. 13, 2004, provisional application No. 60/536,093, filed on Jan. 13, 2004, provisional application No. 60/549,390, filed on Mar. 2, 2004, provisional application No. 60/558,771, filed on Apr. 1, 2004, provisional application No. 60/565,923, filed on Apr. 28, 2004, provisional application No. 60/575,979, filed on Jun. 1, 2004, provisional application No. 60/536,129, filed on Jan. 13, 2004, provisional application No. 60/536,112, filed on Jan. 13, 2004, provisional application No. 60/536,093, filed on Jan. 13, 2004, provisional application No. 60/549,390, filed on Mar. 2, 2004, provisional application No. 60/558,771, filed on Apr. 1, 2004, provisional application No. 60/565,923, filed on Apr. 28, 2004, provisional application No. 60/575,979, filed on Jun. 1, 2004, provisional application No. 60/588,829, filed on Jul. 16, 2004, provisional application No. 60/598,877, filed on Aug. 4, 2004, provisional application No. 60/601,666, filed on Aug. 13, 2004, provisional application No. 60/731,783, filed on Oct. 31, 2005.

(51) Int. Cl.
*G09B 17/00* (2006.01)

(52) U.S. Cl. ......... 434/178; 434/156; 434/157; 434/185

(58) Field of Classification Search .................. 434/116, 434/167, 236, 185
See application file for complete search history.

(56) References Cited

U.S. PATENT DOCUMENTS 2,674,923 A 4/1954 Edgar (Continued)

FOREIGN PATENT DOCUMENTS

EP 411713 A1 2/1991

(Continued)

OTHER PUBLICATIONS

Adams, MJ. *Beginning to read: Thinking and learning about print.* Cambridge, MA. MIT Press. 1999. 3 pages of cover sheet.

(Continued)

*Primary Examiner* — Robert J Utama

(74) *Attorney, Agent, or Firm* — James W. Huffman

(57) ABSTRACT

A method on a computing device for enhancing the memory and cognitive ability of an older adult by requiring the adult to differentiate between rapidly presented stimuli. The method utilizes a sequence of phonemes from a confusable pair which are systematically manipulated to make discrimination between the phonemes less difficult or more difficult based on the success of the adult, such as processing the consonant and vowel portions of the phonemes by emphasizing the portions, stretching the portions, and/or separating the consonant and vowel portions by time intervals. As the adult improves in auditory processing, the discriminations are made progressively more difficult by reducing the amount of processing to that of normal speech. Introductory phonemes may each include a blend of a formant-synthesized phoneme and an acoustically naturalistic phoneme that substantially replicates the spectro-temporal aspects of a naturally produced phoneme, with the blends progressing from substantially natural-sounding to substantially formant-synthesized.

29 Claims, 18 Drawing Sheets

U.S. PATENT DOCUMENTS 3,816,664 A 6/1974 Koch
4,207,087 A 6/1980 Morrison et al.
4,505,682 A 3/1985 Thompson
4,586,905 A 5/1986 Groff
4,802,228 A 1/1989 Silverstein et al.
4,813,076 A 3/1989 Miller
4,820,059 A 4/1989 Miller et al.
4,839,853 A 6/1989 Deerwester et al.
4,879,748 A 11/1989 Picone et al.
5,119,826 A 6/1992 Baart de la Faille
5,121,434 A 6/1992 Mrayati et al.
5,169,342 A 12/1992 Steele et al.
5,215,468 A 6/1993 Lauffer et al.
5,267,734 A 12/1993 Stamper et al.
5,302,132 A 4/1994 Corder
5,303,327 A 4/1994 Sturner et al.
5,387,104 A 2/1995 Corder
5,388,185 A 2/1995 Terry et al.
5,393,236 A 2/1995 Blackmer et al.
5,429,513 A 7/1995 Diaz-Plaza
5,517,595 A 5/1996 Kleijn
5,528,726 A 6/1996 Cook
5,536,171 A 7/1996 Javkin et al.
5,540,589 A 7/1996 Waters
5,553,151 A 9/1996 Goldberg
5,572,593 A 11/1996 Nejime et al.
5,573,403 A 11/1996 Beller et al.
5,617,507 A 4/1997 Lee et al.
5,683,082 A 11/1997 Takemoto et al.
5,690,493 A 11/1997 McAlear, Jr.
5,692,906 A 12/1997 Corder
5,697,789 A 12/1997 Sameth et al.
5,717,818 A 2/1998 Nejime et al.
5,727,950 A 3/1998 Cook et al.
5,806,037 A 9/1998 Sogo
5,813,862 A 9/1998 Merzenich et al.
5,828,943 A 10/1998 Brown
5,868,683 A 2/1999 Protopapas et al.
5,885,083 A 3/1999 Ferrell
5,911,581 A 6/1999 Reynolds et al.
5,927,988 A * 7/1999 Jenkins et al. ................ 434/116
5,929,972 A 7/1999 Hutchinson
5,954,581 A 9/1999 Ohta et al.
5,957,699 A 9/1999 Peterson et al.
6,019,607 A 2/2000 Jenkins et al.
6,026,361 A 2/2000 Hura
6,036,496 A 3/2000 Miller et al.
6,052,512 A 4/2000 Peterson et al.
6,067,638 A 5/2000 Benitz et al.
6,071,123 A 6/2000 Tallal et al.
6,109,107 A 8/2000 Wright et al.
6,113,645 A 9/2000 Benitz et al.
6,120,298 A 9/2000 Jenkins et al.
6,123,548 A 9/2000 Tallal et al.
6,146,147 A 11/2000 Wasowicz
6,159,014 A 12/2000 Jenkins et al.
6,186,794 B1 2/2001 Brown et al.
6,186,795 B1 2/2001 Wilson
6,190,173 B1 2/2001 Jenkins et al.
6,210,166 B1 * 4/2001 Jenkins et al. ................ 434/185
6,224,384 B1 5/2001 Jenkins et al.
6,227,863 B1 5/2001 Spector
6,234,802 B1 5/2001 Pella et al.
6,261,101 B1 7/2001 Benitz et al.
6,289,310 B1 9/2001 Miller et al.
6,290,504 B1 9/2001 Benitz et al.
6,293,801 B1 9/2001 Jenkins et al.
6,299,452 B1 10/2001 Wasowicz et al.
6,302,697 B1 10/2001 Tallal et al.
6,328,569 B1 12/2001 Jenkins et al.
6,331,115 B1 12/2001 Jenkins et al.
6,334,776 B1 1/2002 Jenkins et al.
6,334,777 B1 1/2002 Jenkins et al.
6,356,864 B1 3/2002 Foltz et al.
6,358,056 B1 3/2002 Jenkins et al.
6,364,666 B1 4/2002 Jenkins et al.
6,366,759 B1 4/2002 Burstein et al.
6,386,881 B1 5/2002 Jenkins et al.
6,413,098 B1 7/2002 Tallal et al.
6,435,877 B2 8/2002 Wasowicz
6,511,324 B1 1/2003 Wasowicz
6,533,584 B1 3/2003 Jenkins et al.
6,585,519 B1 7/2003 Jenkins et al.
6,599,129 B2 7/2003 Jenkins et al.
6,629,844 B1 10/2003 Jenkins et al.
6,632,174 B1 10/2003 Breznitz
6,652,283 B1 11/2003 Van Schaack et al.
6,726,486 B2 4/2004 Budra et al.
6,890,181 B2 5/2005 Warneke et al.
2001/0046658 A1 11/2001 Wasowicz
2001/0049085 A1 12/2001 Wasowicz
2002/0034717 A1 3/2002 Jenkins et al.
2003/0092484 A1 5/2003 Schneider et al.
2004/0043364 A1 3/2004 Wasowicz
2004/0175687 A1 9/2004 Burstein et al.
2005/0175972 A1 8/2005 Goldman et al.
2005/0192513 A1 9/2005 Darby et al.
2006/0051727 A1 3/2006 Goldman et al.
2006/0073452 A1 4/2006 Merzenich et al.
2006/0105307 A1 5/2006 Goldman et al.
2006/0177805 A1 8/2006 Merzenich et al.
2007/0111173 A1 5/2007 Hardy et al.

FOREIGN PATENT DOCUMENTS

EP 0534410 A2 3/1993
EP 0534410 A3 12/1993
FR 2695750 A1 3/1994
WO WO9618184 A 6/1996

OTHER PUBLICATIONS

Anglin, JM. "Vocabulary Development: A Morphological Analysis." *Monographs of the Society for Research in Child Development.* 1993. (58, 10).

*Annabelle's Quotation Guide.* www.annabelle.net. Feb. 7, 2002.

Bryant, P, Nunes, T, & Bindman, M. "The relations between Children's Linguistic Awareness and Spelling: The Case of the Apostrophe" *Reading and Writing: An Interdisciplinary Journal.* 2000. (12: 3/4, 253-276).

Carroll, JB. "The Analysis of Reading Instruction: Perspectives from Psychology and Linguistics." *Scientific Studies of Reading.* (4(1) 3-17).

Daneman & Carpenter. "Individual differences in working memory and reading" *Verbal learning and verbal memory.* 1980. (19, 450-466).

Ehri, L & Wilce, LS. "Movement into reading: Is the first stage of printed word learning visual or phonetic?" *Reading Research Quarterly.* 1985. (20, 163-179).

Ferster, CB & Skinnder, BF. *Schedules of Reinforcement.* New York, NY: Appleton Century Crofts. 1957. 2 pages of cover sheet.

Fry. *The Reading Teacher's Book of Lists.* West Nyack, NY: Center for Applied Research in Education. 1984. 3 pages of cover sheet.

Graves, MF. "Vocabulary Learning and Instruction" In EZ Rothkopf (Ed.) *Review of Research in Education.* (13, 49-89). 1986. Washington, DC: American Educational Research Association.

Hall, SL & Moats, LC. *Straight Talk About Reading.* Chicago, IL: Contemporary Books. 1999. 3 pages of cover sheet.

Kucera, H & Francis, WN. *Computational Analysis of Present-Day American English.* 1967. Providence, RI: Brown University Press. 2 pages of cover sheet.

Laberge & Samuels. "Towards a Theory of Automatic Information Processing in Reading" *Cognitive Psychology.* 1974. (6,293-323).

*Language Arts Curriculum Frameworks and Standards.* 2000. Links to available state language arts curriculum frameworks and standards.

Lyon, GR. *Learning to Read: A Call from Research to Action.* www.ncld.org/theirworld/lyon98.html. 1997. 10 pages.

Mahony, D, Singson, M & Mann, VA. "Reading Ability and Sensitivity to Morphophonological Relations." *Reading and Writing: An Interdisciplinary Journal.* 2000. (12:3/4, 191-218).

Mann, VA. "Introduction to Special Issue on Morphology and the Acquisition of Alphabetic Writing Systems." *Reading and Writing: An Interdisciplinary Journal.* 2000. (12:3/4, 143-147).

Mann, VA., Shankweiler, D & Smith, S. "The Association Between Comprehension of Spoken Sentences and Early Reading Ability: The Role of Phonetic Representation" *Journal of Child Language.* 1984. (11, p. 628-643).
Moats, LC, Furry, AR & Brownell, N. *Learning to Read: Components of Beginning Ready Instruction.* Sacramento, CA: Comprehensive Reading Leadership Center. 1998. p. 33.
National Reading Panel. *Teaching Children to Read: An Evidence-based Assessment of the Scientific Research Literature on Reading and its Implications for Reading Instruction.* Report of the National Reading Panel. p. 1-33.
Oregon Literacy, Inc. *Remarks on Reading.* www.hevanet.com/literacy/features/remarks.htm. Feb. 7, 2002. 6 pages.
Rayner, K & Pollatsek, A. *The Psychology of Reading.* Englewood Cliffs, NJ: Prentice Hall. 1989. 3 pages of cover sheet.
Readence, JE, Bean, TW & Baldwin, RS. *Content Area Literacy: An Integrated Approach.* Dubuque, Iowa: Kendall/Hunt Publishing Co. 1998. 3 pages of cover sheet.
*Reading/Language Arts Framework for California Public Schools.* Sacramento, CA: California Department of Education. 1999. p. 22-95.
Scarborough, HS. "Continuity Between Childhood Dyslexia and Adult Reading." *British Journal of Psychology.* Aug. 1984 (75 (Pt 3), 329-48).
Searfoss, LW & Readence, JE. *Helping Children Learn to Read.* Needham, MA: Allyn and Bacon. 4 pages of Cover sheet.
Shankweiler & Liberman. "Misreading: A Search for Causes." *In Language by Ear and by Eye.* Cambridge, MA: MIT Press. 1972. p. 293-295, 297, 299, 301, 303, 306, 208, 310, 312, 314, 315.
Singson, M, Mahony, D & Mann, VA. "The Relation Between Reading Ability and Morphological Skills: Evidence from Derivational Suffixes." *Reading and Writing: An Interdisciplinary Journal.* 2000. (12: 3/4, 219-252).
Snow, CE, Burns, MS & Griffin, P. *Preventing Reading Difficulties in Young Children.* National Research Council Committee on the Prevention of Reading Difficulties in Young Children. Washington, DC: National Academy Press. 1998. 7 pages.
Taylor, I & Taylor MM. *The Psychology of Reading.* New York, NY: Academic Press, 3 pages of cover sheet.
Venezky, RL. *The American Way of Spelling.* New York, NY: Guilford Press. 1999. p. 4-7, 51-95, 125-159, 164, 165, 168-209, 230-245.
Scientific Learning. *Fast-Forward Reading.* 2001. 5 pages.
*English-Language Arts Content Standards for California Public Schools.* California Department of Education. 1997. p. 1-84.
Kavanagh, J & Mattingly, I. *Language by Ear and Eye: The Relationships Between Speech and Reading.* 1992. 3 pages of cover sheet.
PCT Search Report dated Mar. 18, 1996 relating to PCT/US95/15204, a foreign counterpart of U.S. Appl. No. 08/351,803.
Fiez, J. "PET Studies of Auditory and Phonological Processing: Effects of Stimulus Characteristics and Task Demands." *Journal of Cognitive Neuroscience.* 7:3 1995.
Formant.pdf—retrieved from http://en.wikipedia.org/wiki/Formant. Downloaded Dec. 13, 2009. pp. 1-5.
Merzenich, M. *Cortical Plasticity, Learning and Language Dysfunction* 1995.
Fiez, J. "Pet Activation of Posterior Temporal Regions During Auditory Word Presentation and Verb Generation." Cerebral Cortex, 6:1-9. Jan./Feb. 1996.
Barinaga, M. "Giving Language Skills a Boost." *Science.* vol. 271 p. 27-28. Jan. 5, 1996.
Merzenich, M. "Temporal Processing Deficits of Language-Learning Impaired Children Ameliorated by Training." *Science Magazine.* vol. 271 Jan. 5, 1996.
Merzenich, M. *Cortical Plasticity Underlying Perceptual, Motor and Cognitive Skill Development: Implications for Neurorehabilitation.* 1996.
Alexander et al. "Phonological Awareness Training and Remediation of Analytic Decodig Deficits in a Group of Severe Dyslexics" *Annals of Dyslexia.* 1991. vol. 41: 193-206.
Berkell et al. "Auditory Integration Training for Individuals with Autism." *Education and Training in Mental Retardation and Developmental Disabilities.* Mar. 1996. p. 66-70.
Berard, G. *Hearing Equal Behavior.* Keats Publishing, Inc. p. 77-93.
Rimland, B. *Summaries of Research on Auditory Integration Training.* (1993-1995: 11 Studies) 1995. Autism Research Institute.
Tallal et al. "Developmental Aphasia: Impaired Rate of Non-verbal Processing as a Function of Sensory Modality" *Neuropsychologia.* 1973. vol. 11: 389-398.
Tallal et al. "Developmental Aphasia: Rate of Auditory Processing and Selective Impairment of Consonant Perception" *Neuropsychologia.* 1974. vol. 12: 83-93.
Tallal et al. "Developmental Aphasia: The Perception of Brief Vowels and Extended Stop Consonants" *Neuropsychologia.* 1975. vol. 13: 69-74.
Tallal et al. "Language Comprehension in Language-Learning Impaired Children Improved with Acoustically Modified Speech" *Svience.* Jan. 1996. vol. 271: 81-84.
Tallal et al. "Neurobiological Basis of Speech: A Case for the Preeminence of Temporal Processing" *Annals New York Academy of Sciences.* 1993. vol. 682: 27-47.
Elliott et al. "Discrimination of Rising and Falling Simulated Single-Formant Frequency Transitions: Practice and Transition Duration Effects." J. Acoust. Soc. Am. 86(3), 1989.
Flowers, A. "Auditory Perception: Speech, Language and Learning." Chapter 9, *Perceptual Learning Systems.* Dearborn:Michigan. 1983. p. 133-138.
International Dyslexia Organization web site, www.interdys.org (1999).
Levinson et al. *Auditory Processing and Language: Clinical and Research Perspectives.* Chapter 7, Grune & Stratton, New York, New York. 1980. p. 117-133.
Sloan, C. *Treating Auditory Processing Difficulties in Children.* Chapters 4, 5 & 7. Singular Publishing Group, Inc. San Diego, CA 1986; reprinted 1991. p. 35-55, 57-61 and 63-82.
Tallal et al. "The Role of Temporal Processing in Developmental Language-Based Learning Disorders: Research and Clinical Implications." Ch. 7, *Blachman's Foundations of Reading Acquisition and Dyslexia.* 1997.
BPF.pdf—Wikipedia—Band Pass Filter as it existed on May 13, 2004, retrieved from http://web.archive.org/web/20040513223402/http://en.wikipedia/org/wiki/Band-pass_filter (1 of 2) Mar. 24, 2011.

* cited by examiner

/da/
500
502
504
506
508
510
512
35
110
80
110
time (ms)

600
emphasis (dB)
20
10
0
606
604
602
27
frequency (hz)

VOLUME PAUSE GUIDE

VOLUME PAUSE GUIDE

1200

0022

START

1202

VOLUME PAUSE GUIDE

1600

High or Low

Tell Us Apart

Match It

Sound Replay

Listen and Do

Story Teller

Debug Prefs

Exit

VOLUME

PAUSE

GUIDE

VOLUME PAUSE GUIDE

VOLUME PAUSE GUIDE

2900

0000
BANK
EDDIE'S ICE CREAM
DOTS GIFTS
U.S. POST OFFICE
2904
2902

VOLUME PAUSE GUIDE

3000

3100

METHOD FOR MODULATING LISTENER ATTENTION TOWARD SYNTHETIC FORMANT TRANSITION CUES IN SPEECH STIMULI FOR TRAINING

CROSS REFERENCE TO RELATED APPLICATION(S)

This application is a continuation-in-part of co-pending U.S. patent application Ser. No. 11/032,894, filed Jan. 11, 2005, entitled "A METHOD FOR ENHANCING MEMORY AND COGNITION IN AGING ADULTS", which is a continuation-in-part of co-pending U.S. patent application Ser. No. 10/894,388, filed Jul. 19, 2004 entitled "REWARDS METHOD FOR IMPROVED NEUROLOGICAL TRAINING". That application claimed the benefit of the following US Provisional Patent Applications, each of which is incorporated herein in its entirety for all purposes:

| Docket | Ser. No. | Filing Date | Title |
|---|---|---|---|
| NRSC.0101 | 60/536129 | Jan. 13, 2004 | NEUROPLASTICITY TO REVITALIZE THE BRAIN |
| NRSC.0102 | 60/536112 | Jan. 13, 2004 | LANGUAGE MODULE EXERCISE |
| NRSC.0103 | 60/536093 | Jan. 13, 2004 | PARKINSON'S DISEASE, AGING INFIRMITY, ALZHEIMER'S DISEASE |
| NRSC.0104 | 60/549390 | Mar. 2, 2004 | SENSORIMOTOR APPLIANCES |
| NRSC.0105 | 60/558771 | Apr. 1, 2004 | SBIR'S |
| NRSC.0106 | 60/565923 | Apr. 28, 2004 | ATP FINAL |
| NRSC.0108 | 60/575979 | Jun. 1, 2004 | HiFi V 0.5 SOURCE |

The Ser. No. 11/032,894 application also claimed the benefit of the following US Provisional Patent Applications, each of which is incorporated herein in its entirety for all purposes:

| Docket | Ser. No. | Filing Date | Title |
|---|---|---|---|
| NRSC.0101 | 60/536129 | Jan. 13, 2004 | NEUROPLASTICITY TO REVITALIZE THE BRAIN |
| NRSC.0102 | 60/536112 | Jan. 13, 2004 | LANGUAGE MODULE EXERCISE |
| NRSC.0103 | 60/536093 | Jan. 13, 2004 | PARKINSON'S DISEASE, AGING INFIRMITY, ALZHEIMER'S DISEASE |
| NRSC.0104 | 60/549390 | Mar. 2, 2004 | SENSORIMOTOR APPLIANCES |
| NRSC.0105 | 60/558771 | Apr. 1, 2004 | SBIR'S |
| NRSC.0106 | 60/565923 | Apr. 28, 2004 | ATP FINAL |
| NRSC.0108 | 60/575979 | Jun. 1, 2004 | HiFi V 0.5 SOURCE |
| NRSC.0109 | 60/588829 | Jul. 16, 2004 | HiFi SOURCE CODE |
| NRSC.0110 | 60/598877 | Aug. 4, 2004 | HiFi SOURCE CODE |
| NRSC.0111 | 60/601666 | Aug. 13, 2004 | COMPANION GUIDE TO HiFi |

This application also claims the benefit of the following US Provisional Patent Application, which is incorporated herein in its entirety for all purposes:

| | | | |
|---|---|---|---|
| PS.0116 | 60/731783 | Oct. 31, 2005 | METHOD FOR MODULATING LISTENER ATTENTION TOWARD SYNTHETIC FORMANT TRANSITION CUES IN SPEECH STIMULI FOR TRAINING |

FIELD OF THE INVENTION

This invention relates in general to the use of brain health programs utilizing brain plasticity to enhance human performance and correct neurological disorders, and more specifically, to a method for modulating listener attention toward synthetic formant transition cues in speech stimuli for training.

BACKGROUND OF THE INVENTION

Almost every individual has a measurable deterioration of cognitive abilities as he or she ages. The experience of this decline may begin with occasional lapses in memory in one's thirties, such as increasing difficulty in remembering names and faces, and often progresses to more frequent lapses as one ages in which there is passing difficulty recalling the names of objects, or remembering a sequence of instructions to follow directions from one place to another. Typically, such decline accelerates in one's fifties and over subsequent decades, such that these lapses become noticeably more frequent. This is commonly dismissed as simply "a senior moment" or "getting older." In reality, this decline is to be expected and is predictable. It is often clinically referred to as "age-related cognitive decline," or "age-associated memory impairment." While often viewed (especially against more serious illnesses) as benign, such predictable age-related cognitive decline can severely alter quality of life by making daily tasks (e.g., driving a car, remembering the names of old friends) difficult.

In many older adults, age-related cognitive decline leads to a more severe condition now known as Mild Cognitive Impairment (MCI), in which sufferers show specific sharp declines in cognitive function relative to their historical lifetime abilities while not meeting the formal clinical criteria for dementia. MCI is now recognized to be a likely prodromal condition to Alzheimer's Disease (AD) which represents the final collapse of cognitive abilities in an older adult. The development of novel therapies to prevent the onset of this devastating neurological disorder is a key goal for modern medical science.

The majority of the experimental efforts directed toward developing new strategies for ameliorating the cognitive and memory impacts of aging have focused on blocking and possibly reversing the pathological processes associated with the physical deterioration of the brain. However, the positive benefits provided by available therapeutic approaches (most notably, the cholinesterase inhibitors) have been modest to date in AD, and are not approved for earlier stages of memory and cognitive loss such as age-related cognitive decline and MCI.

Cognitive training is another potentially potent therapeutic approach to the problems of age-related cognitive decline, MCI, and AD. This approach typically employs computer- or clinician-guided training to teach subjects cognitive strategies to mitigate their memory loss. Although moderate gains in memory and cognitive abilities have been recorded with cognitive training, the general applicability of this approach has been significantly limited by two factors: 1) Lack of Generalization; and 2) Lack of enduring effect.

Lack of Generalization: Training benefits typically do not generalize beyond the trained skills to other types of cognitive tasks or to other "real-world" behavioral abilities. As a result, effecting significant changes in overall cognitive status would require exhaustive training of all relevant abilities, which is typically infeasible given time constraints on training.

Lack of Enduring Effect: Training benefits generally do not endure for significant periods of time following the end of training. As a result, cognitive training has appeared infeasible given the time available for training sessions, particularly from people who suffer only early cognitive impairments and may still be quite busy with daily activities.

As a result of overall moderate efficacy, lack of generalization, and lack of enduring effect, no cognitive training strategies are broadly applied to the problems of age-related cognitive decline, and to date they have had negligible commercial impacts. The applicants believe that a significantly innovative type of training can be developed that will surmount these challenges and lead to fundamental improvements in the treatment of age-related cognitive decline. This innovation is based on a deep understanding of the science of "brain plasticity" that has emerged from basic research in neuroscience over the past twenty years which only now through the application of computer technology can be brought out of the laboratory and into the everyday therapeutic treatment.

Some cognition improvement exercises, such as embodiments of the Tell Us Apart exercise in the HiFi program described herein, are designed to force participants to identify rapid spectro-temporal patterns (brief synthesized formant transitions) in order to classify consonants by place of articulation under conditions of backward masking from a following vowel. The spectral characteristics of these syllables (as dictated by formant frequencies) closely parallel the patterns that occur in natural productions of the sounds, and they can usually be identified as the speech sounds they are intended to represent. However, since formant frequencies constitute only a (comparatively informative) subset of the range of acoustic cues that accompany human productions of the consonants, sounds synthesized in this way do not closely resemble natural speech in a general sense.

As a result, many participants may be unable to match these synthesized sounds, presented in isolation, with the intended syllables based on their previous linguistic experience, and are therefore unable to progress through the easiest levels of the exercise, which almost certainly involve sound distinctions that are well above their actual thresholds for detection.

More generally, in exercises that use synthesized speech to target specific neurological deficits, it is desired that the effectiveness of a task not be severely limited by the overall naturalness of the speech stimuli, since it is often necessary to reduce the acoustic cues available to the listener to a small, carefully controlled set. Thus, a way is needed to help listeners attend to the set of cues relevant to a synthetic speech distinction so that they can reliably identify sounds and progress through the exercise.

Therefore, what is needed is an overall training program that will significantly improve fundamental aspects of brain performance and function relevant to the remediation of the neurological origins and consequences of age-related cognitive decline. Additionally, improved means for helping listeners attend to the set of cues relevant to a synthetic speech distinction to reliably identify sounds and progress through exercises that utilize such distinctions.

SUMMARY

The training program described below is designed to: Significantly improve "noisy" sensory representations by improving representational fidelity and processing speed in the auditory and visual systems. The stimuli and tasks are designed to gradually and significantly shorten time constants and space constants governing temporal and spectral/spatial processing to create more efficient (accurate, at speed) and powerful (in terms of distributed response coherence) sensory reception. The overall effect of this improvement will be to significantly enhance the salience and accuracy of the auditory representation of speech stimuli under real-world conditions of rapid temporal modulation, limited stimulus discriminability, and significant background noise.

In addition, the training program is designed to significantly improve neuromodulatory function by heavily engaging attention and reward systems. The stimuli and tasks are designed to strongly, frequently, and repetitively activate attentional, novelty, and reward pathways in the brain and, in doing so, drive endogenous activity-based systems to sustain the health of such pathways. The goal of this rejuvenation is to re-engage and re-differentiate 1) nucleus basalis control to renormalize the circumstances and timing of ACh release, 2) ventral tegmental, putamen, and nigral DA control to renormalize DA function, and 3) locus coeruleus, nucleus accumbens, basolateral amygdale and mammillary body control to renormalize NE and integrated limbic system function. The result re-enables effective learning and memory by the brain, and to improve the trained subjects' focused and sustained attentional abilities, mood, certainty, self confidence, motivation, and attention.

The training modules accomplish these goals by intensively exercising relevant sensory, cognitive, and neuromodulatory structures in the brain by engaging subjects in game-like experiences. To progress through an exercise, the subject must perform increasingly difficult discrimination, recognition or sequencing tasks under conditions of close attentional control. The game-like tasks are designed to deliver tremendous numbers of instructive and interesting stimuli, to closely control behavioral context to maintain the trainee 'on task', and to reward the subject for successful performance in a rich, layered variety of ways. Negative feedback is not used beyond a simple sound to indicate when a trial has been performed incorrectly.

In exercises where participants are expected to identify rapid spectro-temporal patterns (brief synthesized formant transitions), such as embodiments of the Tell Us Apart exercise described herein, the fact that formant frequencies constitute only a (comparatively informative) subset of the range of acoustic cues that accompany human productions of the consonants, may cause sounds synthesized in this way to not closely resemble natural speech in a general sense, and as a result, many participants may be unable to match these synthesized sounds, presented in isolation, with the intended syllables based on their previous linguistic experience, and may therefore be unable to progress through the easiest levels of the exercise, which almost certainly involve sound distinctions that are well above their actual thresholds for detection. Thus, in exercises that use synthesized speech to target specific neurological deficits, the effectiveness of a task may be limited by the overall naturalness of the speech stimuli, since it is often necessary to reduce the acoustic cues available to the listener to a small, carefully controlled set.

However, evidence suggests that it is possible to modulate a listener's attention toward specific acoustic cues in a speech signal over the course of short training sessions. Thus, in some embodiments, e.g., for an introductory set of stimuli, e.g., in a training session or series of training sessions, the listener may be exposed first to complex, pseudo-natural versions of the targeted syllables and then, over multiple exposures to the stimuli, the sounds may be progressively mixed or blended with the simpler formant-synthesized versions, until, in the later exposures to the stimuli, the resulting stimuli (phonemes) are primarily or even entirely composed of the formant-synthesized versions. In other words, over the course of multiple exposures, the aurally presented phoneme may be "morphed" from predominately or entirely natural sounding (or at least substantially naturally sounding) to predominately or entirely formant-synthesized, thus training the participant (the aging adult) to more easily recognize the acoustic cues relevant to synthetic speech distinction.

For example, in one embodiment naturalistic cues may be blended with synthesized formants in presentation stimuli in the following manner. A glottal source may be synthesized, e.g., via a computer-based algorithm, i.e., synthesizer, thereby generating a synthesized or modeled glottal source, referred to herein as simply the "glottal source". For example, the same synthesizer or algorithm used to produce the synthetically generated phonemes described with respect to the Tell Us Apart exercise above may be used to synthesize the source.

Note that in general, synthesized phonemes are based on modulation of a glottal source, e.g., a quasi-periodic signal that resembles the output of vibrating vocal folds that is modulated to produce the phoneme. For example, in human speech, the glottal source is processed by the resonant properties of the upper vocal tract, and in the synthesized case, by either a series of time-varying formant filters or a more naturalistic time-varying filter derived from linear prediction analysis of a recorded sound, to 'create' phonemes.

Thus, one version of the synthesized glottal source may be formant-synthesis filtered to generate a synthesized phoneme, where formants are the distinguishing frequency components of human speech (or any other acoustical apparatus). For example, the filter may include formant resonators that operate to amplify characteristic formants in the source, i.e., peaks in the acoustic frequency spectrum resulting from resonances of the (synthesized) vocal apparatus in forming the phoneme. Filtering the synthesized source with formant resonators may thus produce a formant-synthesized phoneme.

Another version or copy of the synthesized glottal source, specifically, one that has not been filtered by the synthesizer's formant resonators, may be processed using a naturalistic time-varying filter to produce another version of the phoneme. For example, in preferred embodiments, the time-varying filter may be derived by autocorrelation linear predictive coding analysis of a natural production of the same syllable or phoneme that is carefully produced and selected to match the spectro-temporal properties of the target phoneme as closely as possible. Such filtering may result in a naturalistic phoneme that is an imperfect replication of the natural production of the phoneme, but that is sufficiently close to facilitate recognition by listeners who may have trouble identifying the purely synthetic sounds, such as the formant-synthesized phoneme from above. In other words, the filter preferably substantially matches the spectro-temporal properties of the natural production of the phoneme, and the naturalistic phoneme at least partially replicates the natural production of the phoneme.

Thus, two versions of the synthesized phoneme may be produced-a formant-synthesized phoneme, and a naturalistic phoneme that has more natural sounding attributes. Note that each phoneme is or includes a respective waveform, which, as is well known in the art, may be further manipulated as desired, e.g., the waveforms may be attenuated or scaled.

The formant-synthesized phoneme, and the naturalistic phoneme may then be multiplied by respective coefficients or weighting factors. More specifically, the wave form of the formant-synthesized phoneme may be multiplied by a first coefficient, e.g., coefficient a, which in this embodiment ranges from 0 to 1, and the naturalistic phoneme may be multiplied by a second coefficient, e.g., coefficient b, which, in this embodiment, is equal to 1−a. As may be seen, since a+b=1, as a ranges from 0 to 1, b ranges from 1 to 0, i.e., as a increases, b decreases.

Note that because the pitch and (as far as possible) the relevant spectral characteristics of the naturalistic phoneme are substantially synchronous with those of the synthesized version, the two waveforms can be combined additively without serious artifacts. Thus, the weighted phonemes, i.e., the attenuated waveforms of the phonemes, may be added together, resulting in a blended phoneme, which may then be presented to the user as an introductory stimulus. Said another way, a weighted sum of the formant-synthesized phoneme and the naturalistic phoneme may be generated.

Each phoneme of at least a subset of the plurality of confusable pairs of phonemes (see the description of the Tell Us Apart described herein) may be created and manipulated as described above to generate a respective blended phoneme, where the coefficients or weighting factors may be progressively tuned such that initially the blend is primarily or entirely the more natural sounding naturalistic phoneme, and, over the course of multiple exposures, the coefficients may be modified to increase the strength or amplitude of the formant-synthesized phoneme and decrease that of the naturalistic phoneme, until the formant-synthesized phoneme dominates the blend, and possibly entirely constitutes the presented phoneme. This may have the effect of allowing the stylized formant transitions (of the formant-synthesized phoneme) first to co-occur with the more familiar sets of cues (of the naturalistic phoneme) and eventually to dominate the stimulus signals, in general serving to highlight the systematic similarities of these sounds to their more natural counterparts. The participant, i.e., the aging adult, may thus be trained to respond to the synthetic formant cues by gradually progressing from the (primarily) natural sounding version of the phoneme to the (primarily) formant-synthesized version of the phoneme.

This type of acoustic processing of the phonemes may be used with respect to a set of introductory stimuli in exercises such as the Tell Us Apart exercise described herein, after which standard synthetic phoneme stimuli may be used, as described above.

Other features and advantages of the present invention will become apparent upon study of the remaining portions of the specification and drawings.

DETAILED DESCRIPTION

Figure 1:
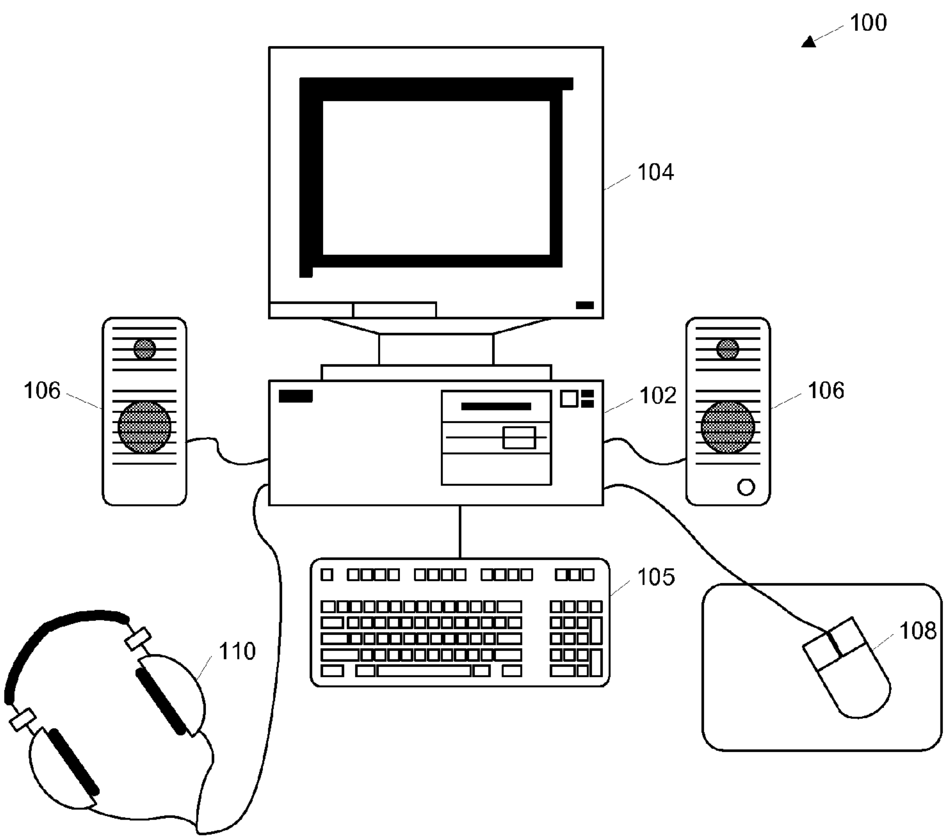
FIG. 1 is a block diagram of a computer system for executing a program according to the present invention.

Referring to FIG. 1, a computer system 100 is shown for executing a computer program to train, or retrain an individual according to the present invention to enhance their memory and improve their cognition. The computer system 100 contains a computer 102, having a CPU, memory, hard disk and CD ROM drive (not shown), attached to a monitor 104. The monitor 104 provides visual prompting and feedback to the subject during execution of the computer program. Attached to the computer 102 are a keyboard 105, speakers 106, a mouse 108, and headphones 110. The speakers 106 and the headphones 110 provide auditory prompting and feedback to the subject during execution of the computer program. The mouse 108 allows the subject to navigate through the computer program, and to select particular responses after visual or auditory prompting by the computer program. The keyboard 105 allows an instructor to enter alpha numeric information about the subject into the computer 102. Although a number of different computer platforms are applicable to the present invention, embodiments of the present invention execute on either IBM compatible computers or Macintosh computers, or similarly configured computing devices such as set top boxes, PDA's, gaming consoles, etc.

Figure 2:
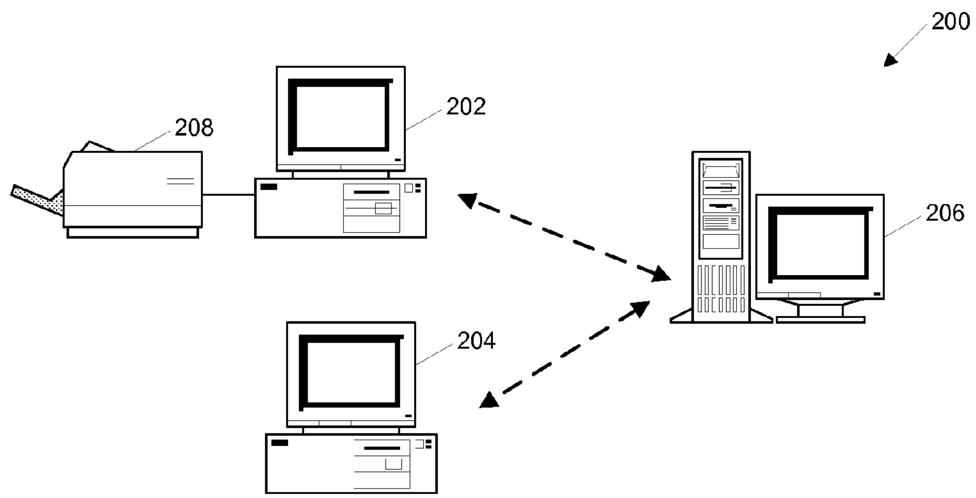
FIG. 2 is a block diagram of a computer network for executing a program according to the present invention.

Now referring to FIG. 2, a computer network 200 is shown. The computer network 200 contains computers 202, 204, similar to that described above with reference to FIG. 1, connected to a server 206. The connection between the computers 202, 204 and the server 206 can be made via a local area network (LAN), a wide area network (WAN), or via modem connections, directly or through the Internet. A printer 208 is shown connected to the computer 202 to illustrate that a subject can print out reports associated with the computer program of the present invention. The computer network 200 allows information such as test scores, game statistics, and other subject information to flow from a subject's computer 202, 204 to a server 206. An administrator can then review the information and can then download configuration and control information pertaining to a particular subject, back to the subject's computer 202, 204.

Before providing a detailed description of the present invention, a brief overview of certain components of speech will be provided, along with an explanation of how these components are processed by subjects. Following the overview, general information on speech processing will be provided so that the reader will better appreciate the novel aspects of the present invention.

Figure 3:
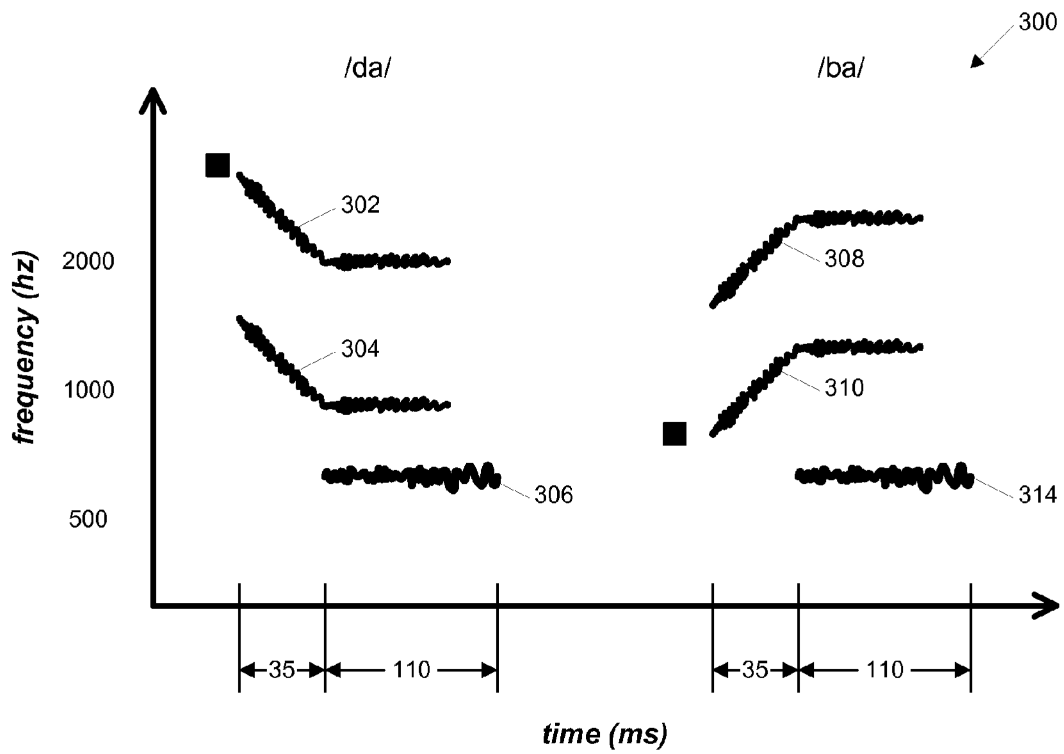
FIG. 3 is a chart illustrating frequency/energy characteristics of two phonemes within the English language.

Referring to FIG. 3, a chart is shown that illustrates frequency components, over time, for two distinct phonemes within the English language. Although different phoneme combinations are applicable to illustrate features of the present invention, the phonemes /da/ and /ba/ are shown. For the phoneme /da/, a downward sweep frequency component 302 (called a formant), at approximately 2.5-2 khz is shown to occur over a 35 ms interval. In addition, a downward sweep frequency component (formant) 304, at approximately 1 khz is shown to occur during the same 35 ms interval. At the end of the 35 ms interval, a constant frequency component (formant) 306 is shown, whose duration is approximately 110 ms. Thus, in producing the phoneme /da/, the stop consonant portion of the element /d/ is generated, having high frequency sweeps of short duration, followed by a long vowel element /a/ of constant frequency.

Also shown are formants for a phoneme /ba/. This phoneme contains an upward sweep frequency component 308, at approximately 2 khz, having a duration of approximately 35 ms. The phoneme also contains an upward sweep frequency component 310, at approximately 1 khz, during the same 35 ms period. Following the stop consonant portion /b/ of the phoneme, is a constant frequency vowel portion 314 whose duration is approximately 110 ms.

Thus, both the /ba/ and /da/ phonemes begin with stop consonants having modulated frequency components of relatively short duration, followed by a constant frequency vowel component of longer duration. The distinction between the phonemes exists primarily in the 2 khz sweeps during the initial 35 ms interval. Similarity exists between other stop consonants such as /ta/, /pa/, /ka/ and /ga/.

Figure 4:
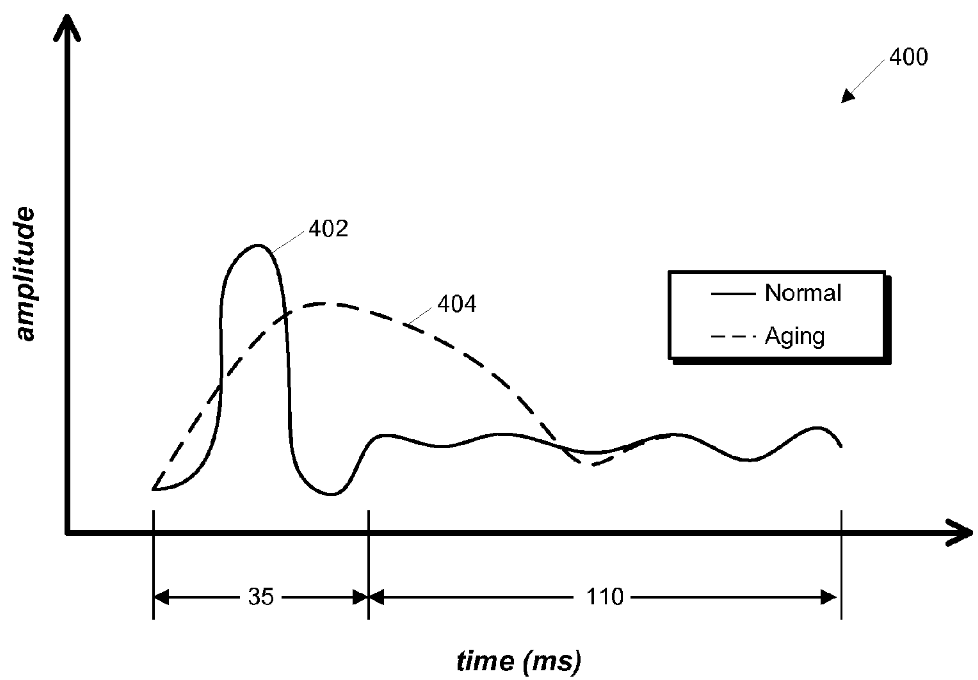
FIG. 4 is a chart illustrating auditory reception of a phoneme by a subject having normal receptive characteristics, and by a subject whose receptive processing is impaired.

Referring now to FIG. 4, the amplitude of a phoneme, for example /ba/, is viewed in the time domain. A short duration high amplitude peak waveform 402 is created upon release of either the lips or the tongue when speaking the consonant portion of the phoneme, that rapidly declines to a constant amplitude signal of longer duration. For an individual with normal temporal processing, the waveform 402 will be understood and processed essentially as it is. However, for an individual whose auditory processing is impaired, or who has abnormal temporal processing, the short duration, higher frequency consonant burst will be integrated over time with the lower frequency vowel, and depending on the degree of impairment, will be heard as the waveform 404. The result is that the information contained in the higher frequency sweeps associated with consonant differences, will be muddled, or indistinguishable.

With the above general background of speech elements, and how subjects process them, a general overview of speech processing will now be provided. As mentioned above, one problem that exists in subjects is the inability to distinguish between short duration acoustic events. If the duration of these acoustic events are stretched, in the time domain, it is possible to train subjects to distinguish between these acoustic events. An example of such time domain stretching is shown in FIG. 5, to which attention is now directed.

Figure 5:
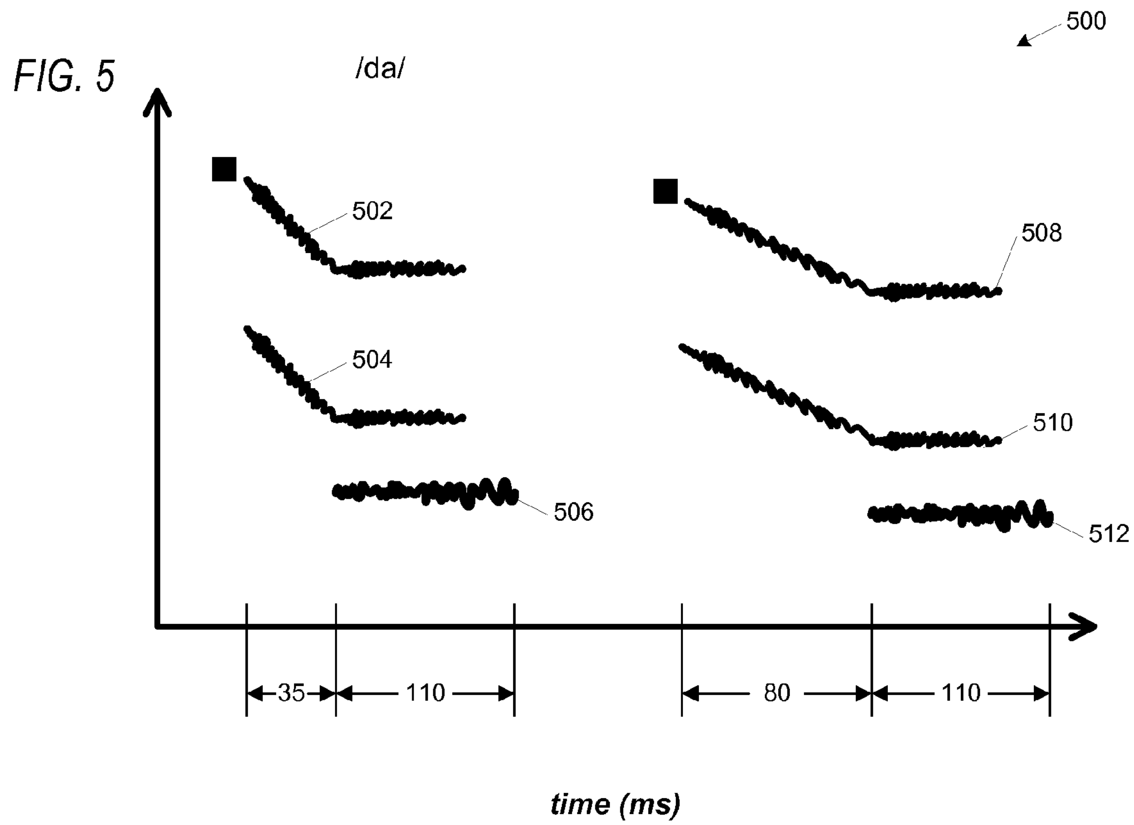
FIG. 5 is a chart illustrating stretching of a frequency envelope in time, according to the present invention.

In FIG. 5, a frequency vs. time graph 500 is shown similar to that described above with respect to FIG. 3. Using existing computer technology, the analog waveforms 502, 504 can be sampled and converted into digital values (using a Fast Fourier Transform, for example). The values can then be manipulated so as to stretch the waveforms in the time domain to a predetermined length, while preserving the amplitude and frequency components of the modified waveforms. The modified waveform can then be converted back into an analog waveform (using an inverse FFT) for reproduction by a computer, or by some other audio device. The waveforms 502, 504 are shown stretched in the time domain to durations of 80 ms (waveforms 508, 510). By stretching the consonant portion of the waveforms 502, 504 without effecting their frequency components, aging subjects with deteriorated acoustic processing can begin to hear distinctions in common phonemes.

Figure 6:
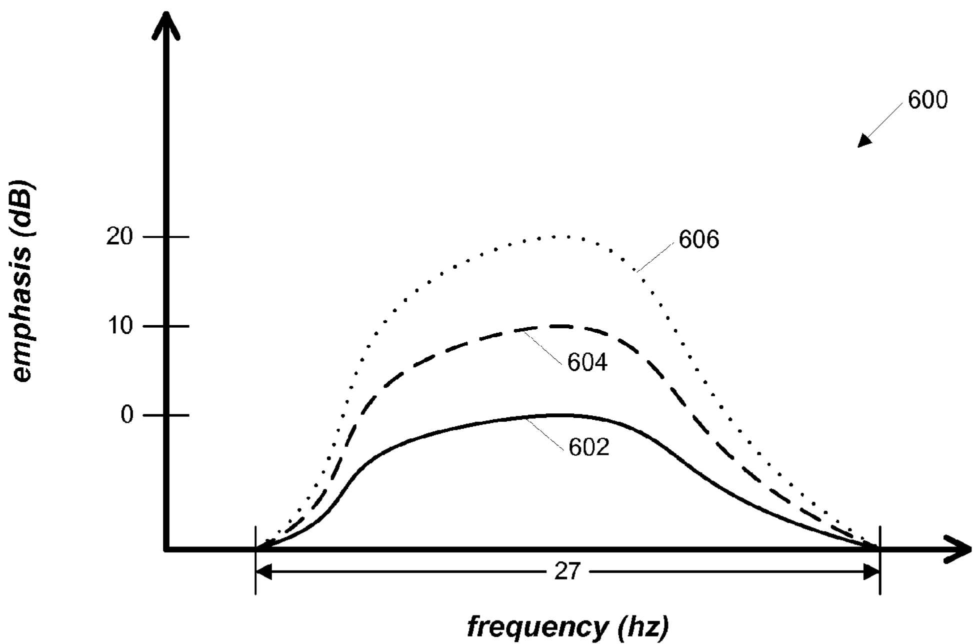
FIG. 6 is a chart illustrating emphasis of selected frequency components, according to the present invention.

Another method that may be used to help subjects distinguish between phonemes is to emphasize selected frequency envelopes within a phoneme. Referring to FIG. 6, a graph 600 is shown illustrating a filtering function 602 that is used to filter the amplitude spectrum of a speech sound. In one embodiment, the filtering function effects an envelope that is 27 Hz wide. By emphasizing frequency modulated envelopes over a range similar to frequency variations in the consonant portion of phonemes, they are made to more strongly engage the brain. A 10 dB emphasis of the filtering function 602 is shown in waveform 604, and a 20 dB emphasis in the waveform 606.

Figure 7:
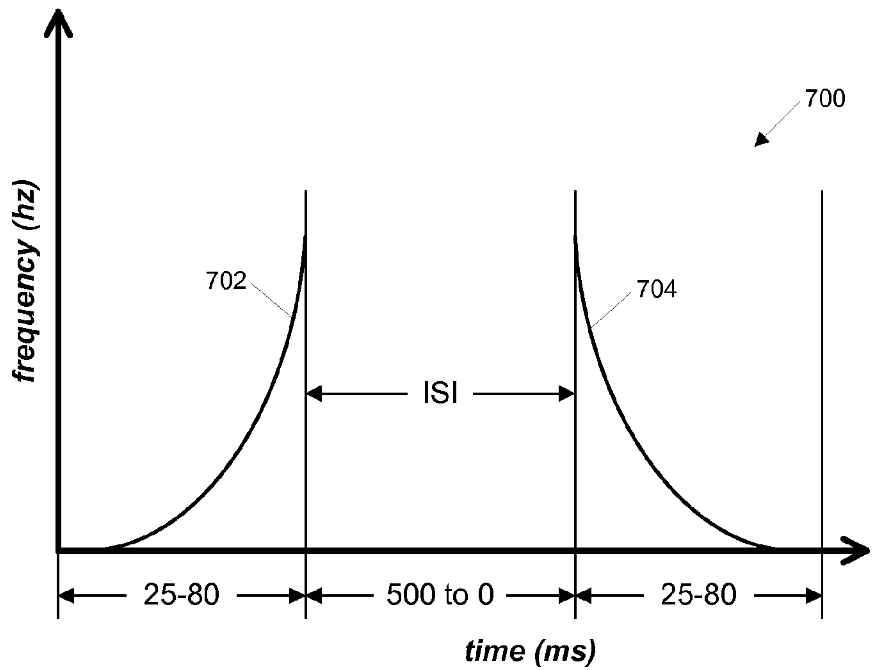
FIG. 7 is a chart illustrating up-down frequency sweeps of varying duration, separated by a selectable inter-stimulus-interval (ISI), according to the present invention.

A third method that may be used to train subjects to distinguish short duration acoustic events is to provide frequency sweeps of varying duration, separated by a predetermined interval, as shown in FIG. 7. More specifically, an upward frequency sweep 702, and a downward frequency sweep 704 are shown, having duration's varying between 25 and 80 milliseconds, and separated by an inter-stimulus interval (ISI) of between 500 and 0 milliseconds. The duration and frequency of the sweeps, and the inter-stimulus interval between the sweeps are varied depending on the processing level of the subject, as will be further described below.

Although a number of methodologies may be used to produce the stretching and emphasis of phonemes, of processing speech to stretch or emphasize certain portions of the speech, and to produce sweeps and bursts, according to the present invention, a complete description of the methodology used within HiFi is described in Appendix G, which should be read as being incorporated into the body of this specification.

Appendices H, I and J have further been included, and are hereby incorporated by reference to further describe the code which generates the sweeps, the methodology used for incrementing points in each of the exercises, and the stories used in the exercise Story Teller.

Each of the above described methods have been combined in a unique fashion by the present invention to provide an adaptive training method and apparatus for enhancing memory and cognition in aging adults. The present invention is embodied into a computer program entitled HiFi by Neuroscience Solutions, Inc. The computer program is provided to a participant via a CD-ROM which is input into a general purpose computer such as that described above with reference to FIG. 1. Specifics of the present invention will now be described with reference to FIGS. 8-32.

Figure 8:
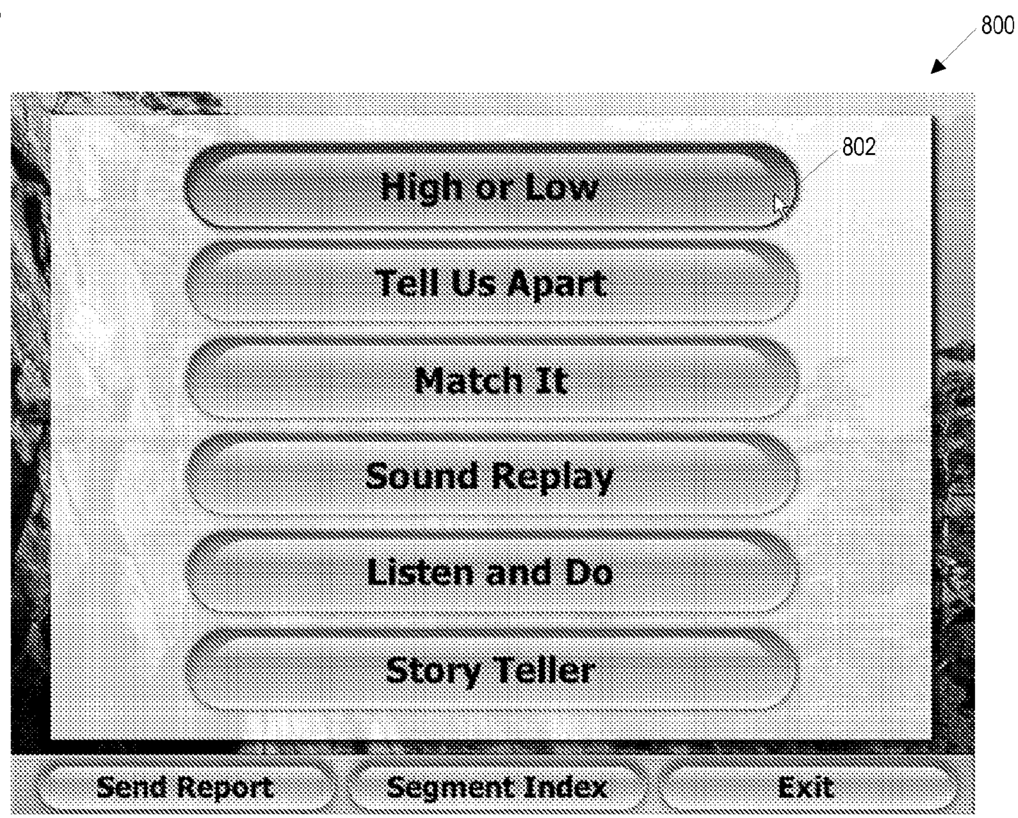
FIG. 8 is a pictorial representation of a game selection screen according to the present invention.

Referring to FIG. 8, an initial screen shot 800 is shown which provides buttons 802 for selection of one of the six exercises provided within the HiFi computer program. It is anticipated that more exercises may be added within the HiFi program, or alternate programs used to supplement or replace the exercises identified in the screen shot 800. In one embodiment, a participant begins training by selecting the first exercise (High or Low) and progressing sequentially through the exercises. That is, the participant moves a cursor over one of the exercise buttons, which causes a button to be highlighted, and then indicates a selection by pressing a computer mouse, for example. In an alternate embodiment, the exercises available for training are pre-selected, based on the participant's training history, and are available in a prescribed order. That is, based on the participant's success or failure in previous training sessions, or the time a participant has spent in particular exercises, an optimized schedule for a particular day is determined and provided to the participant via the selection screen. For example, to allow some adaptation of a training regimen to a participant's schedule, an hour per day is prescribed for N number of weeks (e.g., 8 weeks). This would allow 3-4 exercises to be presented each day. In another model, an hour and a half per day might be prescribed for a number of weeks, which would allow either more time for training in each exercise, each day, or more than 3-4 exercises to be presented each day. In either case, it should be appreciated that a training regiment for each exercise should be adaptable according to the participant's schedule, as well as to the participant's historical performance in each of the exercises. Once the participant has made a selection, in this example, the exercise HIGH or LOW is selected, training proceeds to that exercise.

High or Low

Figure 9:
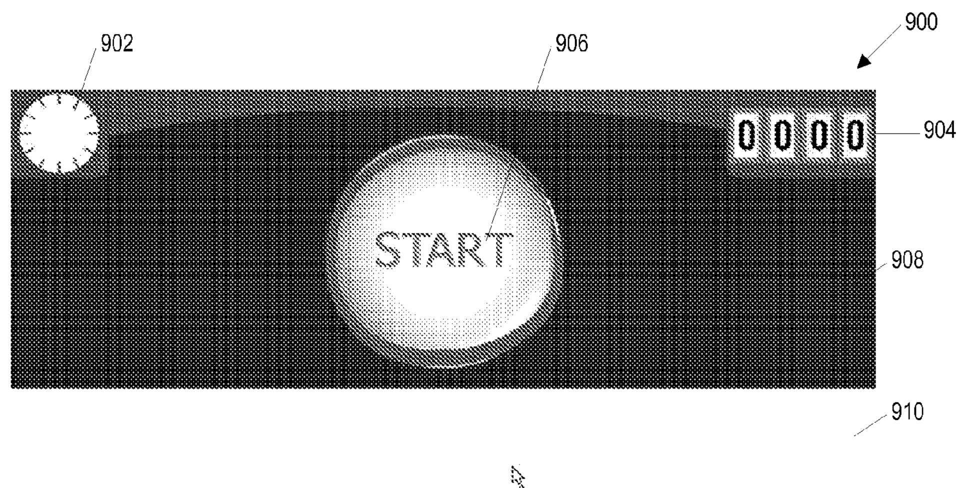
FIG. 9 is a screen shot of an initial screen in the exercise High or Low.

Referring now to FIG. 9, a screen shot is shown of the initial training screen for the exercise HIGH or LOW. Elements within the training screen 900 will be described in detail, as many are common for all of the exercises within the HiFi program. In the upper left of the screen 900 is a clock 902. The clock 902 does not provide an absolute reference of time. Rather, it provides a relative progress indicator according to the time prescribed for training in a particular game. For example, if the prescribed time for training was 12 minutes, each tick on the clock 902 would be 1 minute. But, if the prescribed time for training was 20 minutes, then each tick on the clock would be 20/12 minutes. In the following figures, the reader will note how time advances on the clock 902 in consecutive screens. Also shown is a score indicator 904. The score indicator 904 increments according to correct responses by the participant. In one embodiment, the score does not increment linearly. Rather, as described in co-pending application U.S. Ser. No. 10/894,388, filed Jul. 19, 2004 and entitled "REWARDS METHOD FOR IMPROVED NEUROLOGICAL TRAINING", the score indicator 904 may increment non-linearly, with occasional surprise increments to create additional rewards for the participant. But, regardless of how the score is incremented, the score indicator provides the participant an indication of advancement in their exercise. The screen 900 further includes a start button 906 (occasionally referred to in the Appendices as the OR button). The purpose of the start button 906 is to allow the participant to select when they wish to begin a new trial. That is, when the participant places the cursor over the start button 906, the button is highlighted. Then, when the participant indicates a selection of the start button 906 (e.g., by click the mouse), a new trial is begun. The screen 900 further includes a trial screen portion 908 and a graphical reward portion 910. The trial screen portion 908 provides an area on the participant's computer where trials are graphically presented. The graphical reward portion 910 is provided, somewhat as a progress indicator, as well as a reward mechanism, to cause the participant to wish to advance in the exercise, as well as to entertain the participant. The format used within the graphical reward portion 910 is considered novel by the inventors, and will be better described as well as shown, in the descriptions of each of the exercises.

Figure 10:
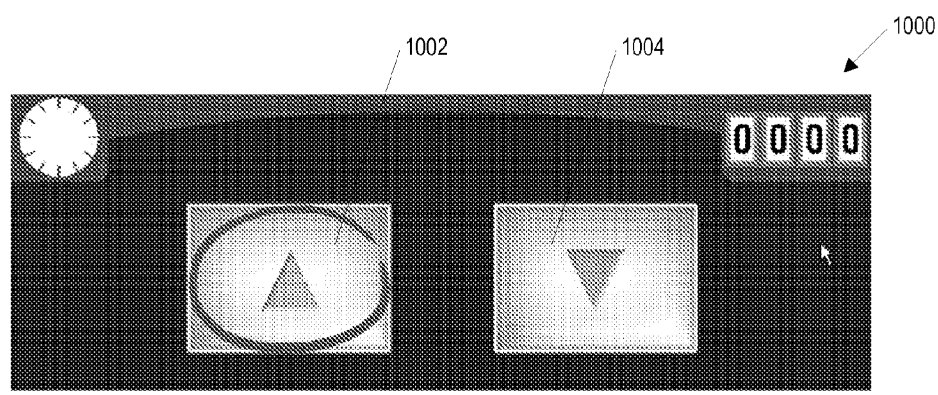
FIG. 10 is a screen shot of a trial within the exercise High or Low.

Referring now to FIG. 10, a screen shot 1000 is shown of an initial trial within the exercise HIGH or LOW. The screen shot 1000 is shown after the participant selects the start button 906. Elements of the screen 1000 described above with respect to FIG. 9 will not be referred to again, but it should be appreciated that unless otherwise indicated, their function performs as described above with respect to FIG. 9. Additionally, two blocks 1002 and 1004 are presented to the participant. The left block 1002 shows an up arrow. The right block 1004 shows a down arrow. The blocks 1002, 1004 are intended to represent auditory frequency sweeps that sweep up or down in frequency, respectively. Within the context of this application, the blocks 1002, 1004 are referred to as icons. In one embodiment, icons are pictorial representations that are selectable by the participant to indicate a selection. Icons may graphically illustrate an association with an aural presentation, such as an up arrow 1002, or may indicate a phoneme (e.g., BA), or even a word. Further, icons may be used to indicate correct selections to trials, or incorrect selections. Any use of a graphical item within the context of the present exercises, other than those described above with respect to FIG. 9 may be referred to as icons. In some instances, the term grapheme may also be used, although applicant's believe that icon is more representative of selectable graphical items.

In one embodiment, the participant is presented with two or more frequency sweeps, each separated by an inter-stimulus-interval (ISI). For example, the sequence of frequency sweeps might be (UP, DOWN, UP). The participant is required, after the frequency sweeps are auditorily presented, to indicate the order of the sweeps by selecting the blocks 1002, 1004, according to the sweeps. Thus, if the sequence presented was UP, DOWN, UP, the participant would be expected to indicate the sequence order by selecting the left block 1002, then right block 1004, then left block 1002. If the participant correctly indicates the sweep order, as just defined, then they have correctly responded to the trial, the score indicator increments, and a "ding" is played to indicate a correct response. If the participant incorrectly indicates the sweep order, then they have incorrectly responded to the trial, and a "thunk" is played to indicate an incorrect response. With the above understanding of training with respect to the exercise HIGH or LOW, specifics of the game will now be described.

A goal of this exercise is to expose the auditory system to rapidly presented successive stimuli during a behavior in which the participant must extract meaningful stimulus data from a sequence of stimulus. This can be done efficiently using time order judgment tasks and sequence reconstruction tasks, in which participants must identify each successively present auditory stimulus. Several types of simple, speech-like stimuli are used in this exercise to improve the underlying ability of the brain to process rapid speech stimuli: frequency modulated (FM) sweeps, structured noise bursts, and phoneme pairs such as /ba/ and /da/. These stimuli are used because they resemble certain classes of speech. Sweeps resemble stop consonants like /b/ or /d/. Structured noise bursts are based on fricatives like /sh/ or /f/, and vowels like /a/ or /i/. In general, the FM sweep tasks are the most important for renormalizing the auditory responses of participants. The structured noise burst tasks are provided to allow high-performing participants who complete the FM sweep tasks quickly an additional level of useful stimuli to continue to engage them in time order judgment and sequence reconstruction tasks.

This exercise is divided into two main sections, FM sweeps and structured noise bursts. Both of these sections have: a Main Task, an initiation for the Main Task, a Bonus Task, and a short initiation for the Bonus Task. The Main Task in FM sweeps is Task 1 (Sweep Time Order Judgment), and the Bonus Task is Task 2 (Sweep Sequence Reconstruction). FM Sweeps is the first section presented to the participant. Task 1 of this section is closed out before the participant begins the second section of this exercise, structured noise bursts. The Main Task in structured noise bursts is Task 3 (Structured Noise Burst Time Order Judgment), and the Bonus Task is Task 4 (Structured Noise Burst Sequence Reconstruction). When Task 3 is closed out, the entire Task is reopened beginning with easiest durations in each frequency. The entire Task is replayed.

Task 1—Main Task: Sweep Time Order Judgment

This is a time order judgment task. Participants listen to a sequential pair of FM sweeps, each of which can sweep upwards or downwards. Participants are required to identify each sweep as upwards or downwards in the correct order. The task is made more difficult by changing both the duration of the FM sweeps (shorter sweeps are more difficult) and decreasing the inter-stimulus interval (ISI) between the FM sweeps (shorter ISIs are more difficult).

Stimuli consist of upwards and downwards FM sweeps, characterized by their base frequency (the lowest frequency in the FM sweep) and their duration. The other characteristic defining an FM sweep, the sweep rate, is held constant at 16 octaves per second throughout the task. This rate was chosen to match the average FM sweep rate of formants in speech (e.g., ba/da). A pair of FM sweeps is presented during a trial. The ISI changes based on the participant's performance. There are three base frequencies:

| Base Frequency Index | Base Frequency |
|---|---|
| 1 | 500 Hz |
| 2 | 1000 Hz |
| 3 | 2000 Hz |

There are five durations:

| Duration Index | Duration |
|---|---|
| 1 | 80 ms |
| 2 | 60 ms |
| 3 | 40 ms |
| 4 | 35 ms |
| 5 | 30 ms |

Initially, a "training" session is provided to illustrate to the participant how the exercise is to be played. More specifically, an upward sweep is presented to the participant, followed by an indication, as shown in FIG. 10 of block 1002 circled in red, to indicate to the participant that they are to select the upward arrow block 1002 when they hear an upward sweep. Then, a downward sweep is presented to the participant, followed by an indication (not shown) of block 1004 circled in red, to indicate to the participant that they are to select the downward arrow block 1004 when they hear a downward sweep. The initial training continues by presenting the participant with an upward sweep, followed by a downward sweep, with red circles appearing first on block 1002, and then on block 1004. The participant is presented with several trials to insure that they understand how trials are to be responded to. Once the initial training completes, it is not repeated. That is, the participant will no longer be presented with hints (i.e., red circles) to indicate the correct selection. Rather, after selecting the start button, an auditory sequence of frequency sweeps is presented, and the participant must indicate the order of the frequency sweeps by selecting the appropriate blocks, according to the sequence.

Figures 11, 12:
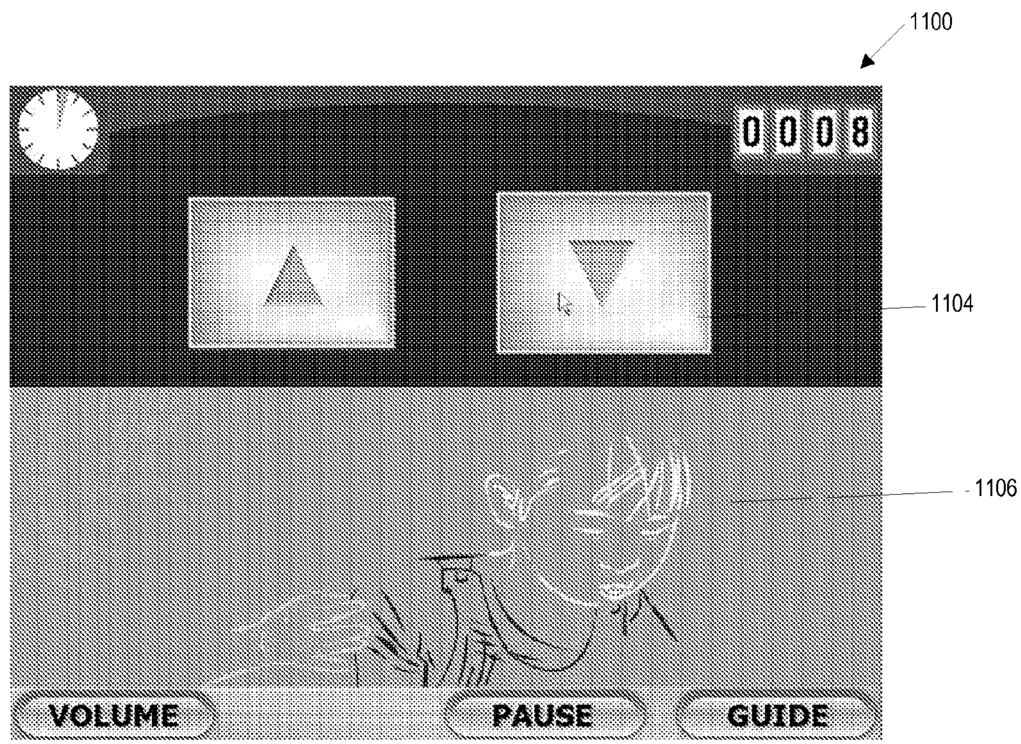
FIG. 11 is a screen shot during a trial within the exercise High or Low showing progress within a graphical award portion of the screen.
FIG. 12 is a screen shot showing a completed picture within a graphical award portion of the screen during training of the exercise High or Low.

Referring now to FIG. 11, a screen shot 1100 is provided to illustrate a trial. In this instance, the right block 1104 is being selected by the participant to indicate a downward sweep. If the participant correctly indicates the sweep order, the score indicator is incremented, and a "ding" is played, as above. In addition, within the graphical reward portion 1106 of the screen 1100, part of an image is traced out for the subject. That is, upon completion of a trial, a portion of a reward image is traced. After another trial, an additional portion of a reward image is traced. Then, after several trials, the complete image is completed and shown to the participant. Thus, upon initiation of a first trial, the graphical reward portion 1106 is blank. But, as each trial is completed, a portion of a reward image is presented, and after a number of trials, the image is completed. One skilled in the art will appreciate that the number of trials required to completely trace an image may vary. What is important is that in addition to incrementing a counter to illustrate correct responses, the participant is presented with a picture that progressively advances as they complete trials, whether or not the participant correctly responds to a trial, until they are rewarded with a complete image. It is believed that this progressive revealing of reward images both entertains and holds the interest of the participant. And, it acts as an encouraging reward for completing a number of trials, even if the participant's score is not incrementing. Further, in one embodiment, the types of images presented to the participant are selected based on the demographics of the participant. For example, types of reward image libraries include children, nature, travel, etc., and can be modified according to the demographics, or other interests of the subject being trained. Applicant's are unaware of any "reward" methodology that is similar to what is shown and described with respect to the graphical reward portion.

Referring to FIG. 12, a screen shot 1200 is shown within the exercise HIGH or LOW. The screen shot 1200 includes a completed reward image 1202 in the graphical reward portion of the screen. In one embodiment, the reward image 1202 required the participant to complete six trials. But, one skilled in the art will appreciate that any number of trials might be selected before the reward image is completed. Once the reward image 1202 is completed, the next trial will begin with a blank graphical reward portion.

Figure 13:
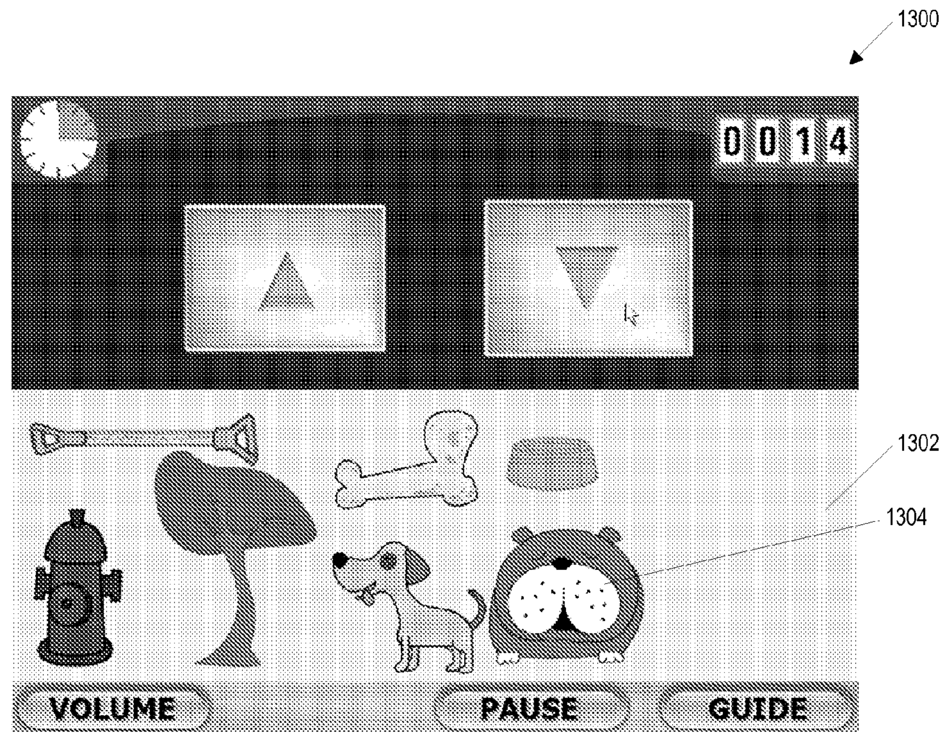
FIG. 13 is a screen shot showing alternative graphical progress during training within the exercise High or Low.

Referring to FIG. 13, a screen shot 1300 is shown within the exercise HIGH or LOW. In this screen 1300 the graphical reward portion 1302 is populated with a number of figures such as the dog 1304. In one embodiment, a different figure is added upon completion of each trial. Further, in one embodiment, each of the figures relate to a common theme, for a reward animation that will be forthcoming. More specifically at intervals during training, when the participant has completed a number of trials, a reward animation is played to entertain the participant, and provide a reward to training. The figures shown in the graphical reward portion 1302 correspond to a reward animation that has yet to be presented.

Figure 14:
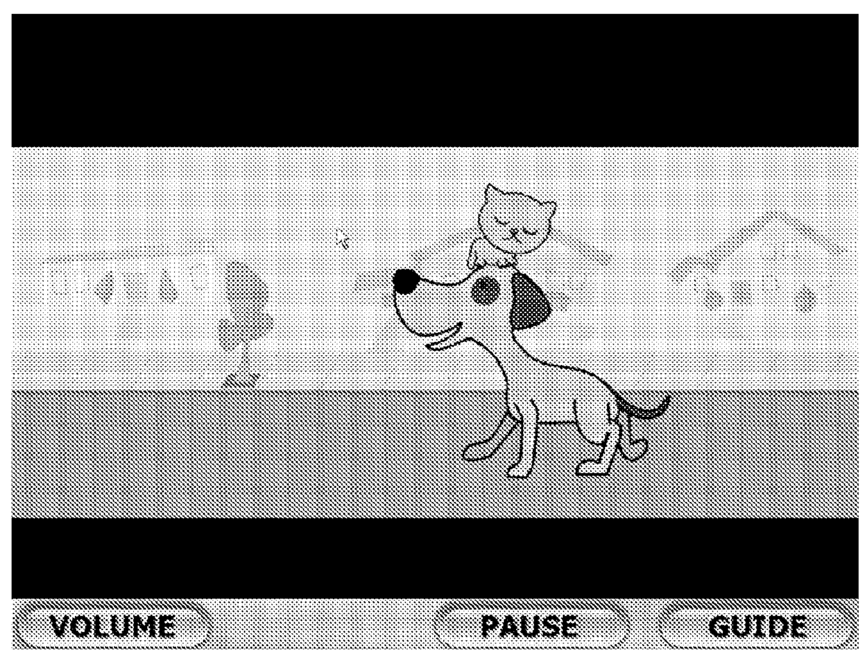
FIG. 14 is a screen shot showing a reward animation within the exercise High or Low.

Referring now to FIG. 14, a reward animation 1400, such as that just described is shown. Typically, the reward animation is a moving cartoon, with music in the background, utilizing the figures added to the graphical reward portion at the end of each trial, as described above.

Figure 15:
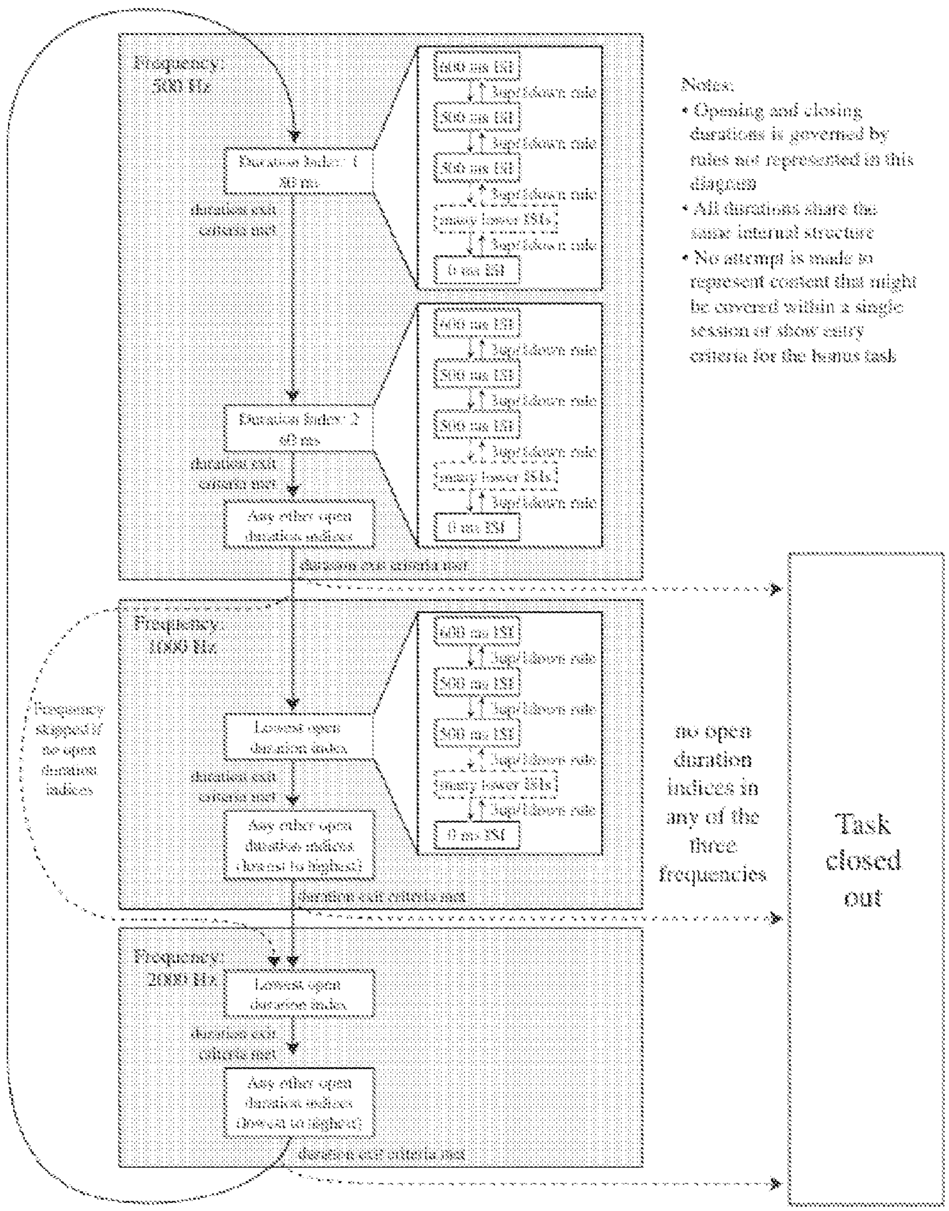
FIG. 15 is a flow chart illustrating advancement through the processing levels within the exercise High or Low.

Referring now to FIG. 15, a flow chart is shown which illustrates progression thru the exercise HIGH or LOW. The first time in Task 1, a list of available durations (categories) with a current ISI is created within each frequency. At this time, there are categories in this list that have a duration index of 1 and a current ISI of 600 ms. Other categories (durations) are added (opened) as the participant progresses through the Task. Categories (durations) are removed from the list (closed) when specific criteria are met.

Choosing a frequency, duration (category) and ISI: The first time in: the participant begins by opening duration index 1 (80 ms) in frequency index 1 (500 Hz). The starting ISI is 600 ms when opening a duration and the ISI step size index when entering a duration is 1.

Beginning subsequent sessions: The participant moves to a new frequency unless the participant has completed less than 20 trials in Task 1 of the previous session's frequency.

Returning from Task 2 (bonus task): The participant will be switching durations, but generally staying in the same frequency.

Switching frequencies: The frequency index is incremented, cycling the participant through the frequencies in order by frequency index (500 Hz, 1000 Hz, 200 Hz, 500 Hz, etc.). If there are no open durations in the new frequency, the frequency index is incremented again until a frequency is found that has an open duration. If all durations in all frequencies have been closed out, Task 1 is closed. The participant begins with the longest open duration (lowest duration index) in the new frequency.

Switching durations: Generally, the duration index is incremented until an open duration is found (the participant moves from longer, easier durations to shorter, harder durations). If there are no open durations, the frequency is closed and the participant switches frequencies. A participant switches into a duration with a lower index (longer, easier duration) when 10 incorrect trials are performed at an ISI of 1000 ms at a duration index greater than 1.

Progression within a duration changes in ISI: ISIs are changed using a 3-up/1-down adaptive tracking rule: Three consecutive correct trials equals advancement—ISI is shortened. One incorrect equals retreat—ISI is lengthened. The amount that the ISI changes is adaptively tracked. This allows participants to move in larger steps when they begin the duration and then smaller steps as they approach their threshold. The following step sized are used:

| ISI Step Size Index | ISI Step Size |
|---|---|
| 1 | 50 ms |
| 2 | 25 ms |
| 3 | 10 ms |
| 4 | 5 ms |

When starting a duration, the ISI step index is 1 (50 ms). This means that 3 consecutive correct trials will shorten the ISI by 50 ms and 1 incorrect will lengthen the ISI by 50 ms—3up/1down. The step size index is increased after every second Sweeps reversal. A Sweeps reversal is a "change in direction". For example, three correct consecutive trials shortens the ISI. A single incorrect lengthens the ISI. The drop to a longer ISI after the advancement to a shorter ISI is counted as one reversal. If the participant continues to decrease difficulty, these drops do not count as reversals. A "change in direction" to 3 consecutive correct responses counts as a second reversal.

A total of 8 reversals are allowed within a duration; the $9^{th}$ reversal results in the participant exiting the duration; the duration remains open unless criteria for stable performance have been met. ISI never decreases to lower than 0 ms, and never increases to more than 1000 ms. The tracking toggle pops the participant out of the Main Task and into Task Initiation if there are 5 sequential increases in ISI. The current ISI is stored. When the participant passes initiation, they are brought back into the Main Task. Duration re-entry rules apply. A complete description of progress through the exercise High or Low is found on Appendix A.

To allow the text of this specification to be presented clearly, the details relating to progression methodology, processing, stimuli, etc., for each of the exercises within HiFi have been placed in Appendices to this specification. However, applicants consider the appendices to be part of this specification. Therefore, they should be read as part of this specification, and as being incorporated within the body of this specification for all purposes.

Stretch and Emphasis Processing of Natural Speech in HiFi

In order to improve the representational fidelity of auditory sensory representations in the brain of trained individuals, natural speech signals are initially stretched and emphasized. The degree of stretch and emphasis is reduced as progress is made through the exercise. In the final stage, faster than normal speech is presented with no emphasis.

Both stretching and emphasis operations are performed using the Praat (v. 4.2) software package (http://www.fon.hum.uva.nl/praat/) produced by Paul Boersma and David Weenink at the Institute for Phonetic Sciences at the University of Amsterdam. The stretching algorithm is a Pitch-Synchronous OverLap-and-Add method (PSOLA). The purpose of this algorithm is lengthen or shorten the speech signal over time while maintaining the characteristics of the various frequency components, thus retaining the same speech information, only in a time-altered form. The major advantage of the PSOLA algorithm over the phase vocoder technique used in previous versions of the training software is that PSOLA maintains the characteristic pitch-pulse-phase synchronous temporal structure of voiced speech sounds. An artifact of vocoder techniques is that they do not maintain this synchrony, creating relative phase distortions in the various frequency components of the speech signal. This artifact is potentially detrimental to older observers whose auditory systems suffer from a loss of phase-locking activity. A minimum frequency of 75 Hz is used for the periodicity analysis. The maximum frequency used is 600 Hz. Stretch factors of 1.5, 1.25, 1 and 0.75 are used.

The emphasis operation used is referred to as band-modulation deepening. In this emphasis operation, relatively fast-changing events in the speech profile are selectively enhanced. The operation works by filtering the intensity modulations in each critical band of the speech signal. Intensity modulations that occur within the emphasis filter band are deepened, while modulations outside that band are not changed. The maximum enhancement in each band is 20 dB. The critical bands span from 300 to 8000 Hz. Bands are 1 Bark wide. Band smoothing (overlap of adjacent bands) is utilized to minimize ringing effects. Band overlaps of 100 Hz are used. The intensity modulations within each band are calculated from the pass-band filtered sound obtained from the inverse Fourier transform of the critical band signal. The time-varying intensity of this signal is computed and intensity modulations between 3 and 30 Hz are enhanced in each band. Finally, a full-spectrum speech signal is recomposed from the enhanced critical band signals. The major advantage of the method used here over methods used in previous versions of the software is that the filter functions used in the intensity modulation enhancement are derived from relatively flat Gaussian functions. These Gaussian filter functions have significant advantages over the FIR filters designed to approximate rectangular-wave functions used previously. Such FIR functions create significant ringing in the time domain due to their steepness on the frequency axis and create several maxima and minima in the impulse response. These artifacts are avoided in the current methodology.

Figures 16, 17:
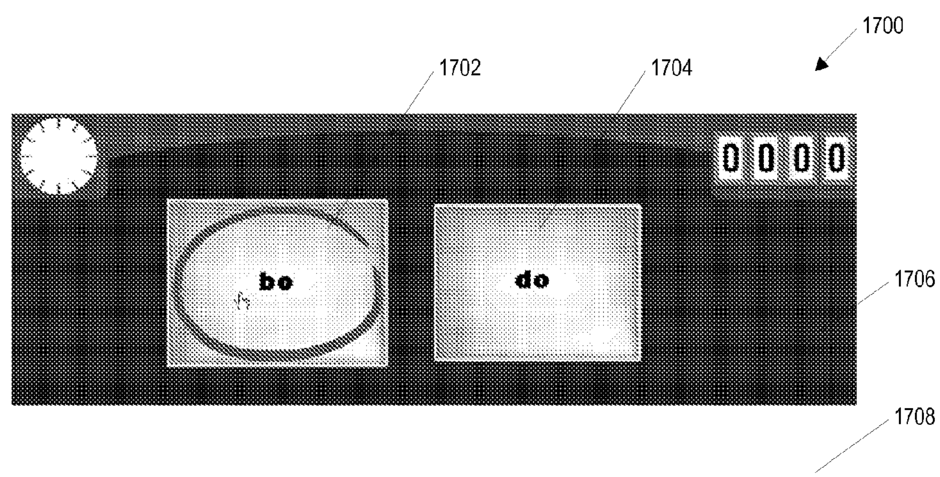
FIG. 16 is a selection screen illustrating selection of the next exercise in the training of HiFi, particularly the exercise Tell us Apart.
FIG. 17 is an initial screen shot within the exercise Tell us Apart.

The following levels of stretching and emphasis are used in HiFi:

Level 1=1.5 stretch, 20 dB emphasis
Level 2=1.25 stretch, 20 dB emphasis
Level 3=1.00 stretch, 10 dB emphasis
Level 4=0.75 stretch, 10 dB emphasis
Level 5=0.75 stretch, 0 dB emphasis Tell Us Apart Referring now to FIG. 16, a screen shot is shown of an exercise selection screen 1600. In this instance, the exercise Tell us Apart is being selected. Upon selection, the participant is taken to the exercise. In one embodiment, the participant is returned to the exercise selection screen 1600 when time expires in a current exercise. In an alternative embodiment, the participant is taken immediately to the next prescribed exercise, without returning to the selection screen 1600.

Applicant's believe that auditory systems in older adults suffer from a degraded ability to respond effectively to rapidly presented successive stimuli. This deficit manifests itself psychophysically in the participant's poor ability to perform auditory stimulus discriminations under backward and forward masking conditions. This manifests behaviorally in the participant's poor ability to discriminate both the identity of consonants followed by vowels, and vowels preceded by consonants. The goal of Tell us Apart is to force the participant to make consonant and vowel discriminations under conditions of forward and backward masking from adjacent vowels and consonants respectively. This is accomplished using sequential phoneme identification tasks and continuous performance phoneme identification tasks, in which participants identify successively presented phonemes. Applicants assume that older adults will find making these discriminations difficult, given their neurological deficits. These discriminations are made artificially easy (at first) by using synthetically generated phonemes in which both 1) the relative loudness of the consonants and vowels and/or 2) the gap between the consonants and vowels has been systematically manipulated to increase stimulus discriminability. As the participant improves, these discriminations are made progressively more difficult by making the stimuli more normal.

Referring now to FIG. 17, a screen shot 1700 is shown of an initial training screen within the exercise Tell us Apart. As in the exercise High or Low, the screen 1700 includes a timer, a score indicator, a trial portion, and a graphical reward portion. After the participant selects the Start button, two phonemes, or words, are graphically presented, (1702 and 1704 respectively). Then, one of the two words is presented in an acoustically processed form as described above. A more detailed description of a one embodiment of the acoustic processing of the phoneme is described below in the section titled "Acoustic Processing of Stimuli". The participant is required to select one of the two graphically presented words 1702, 1704 to pair with the acoustically processed word. The selection is made when the participant places the cursor over one of the two graphical words, and indicates a selection (e.g., by clicking on a mouse button). If the participant makes a correct selection, the score indicator increments, and a "ding" is played. If the participant makes an incorrect selection, a "thunk" is played.

Figure 18:
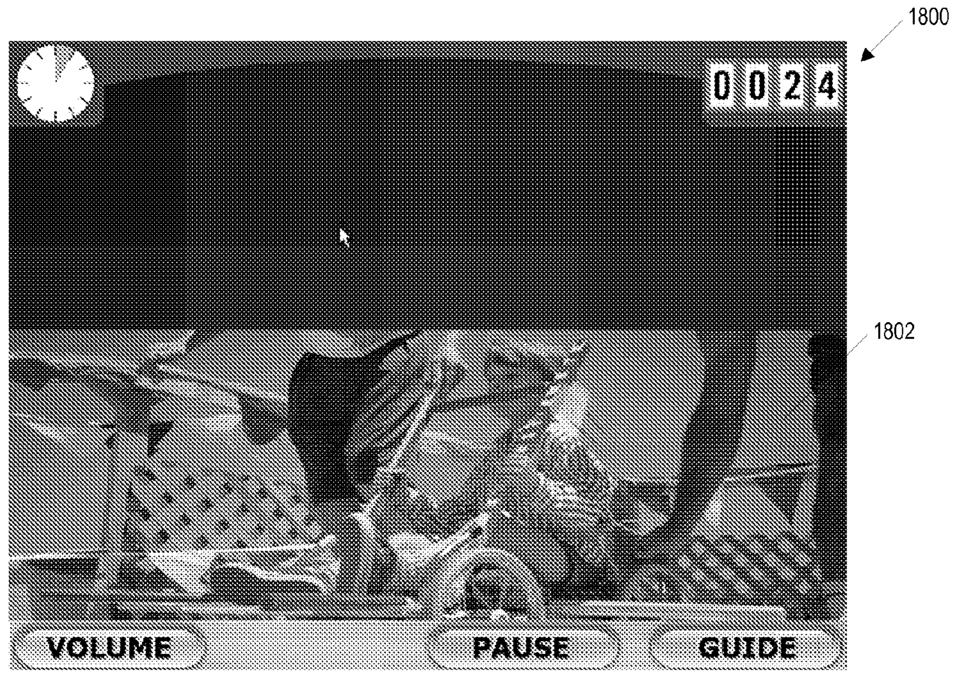
FIG. 18 is a screen shot within the exercise Tell us Apart particularly illustrating progress in the graphical award portion of the screen.

Referring to FIG. 18, a screen shot 1800 is shown, particularly illustrating a graphical reward portion 1802 that is traced, in part, upon completion of a trial. And, over a number of trials, the graphical reward portion is completed in trace form, finally resolving into a completed picture.

Figure 19:
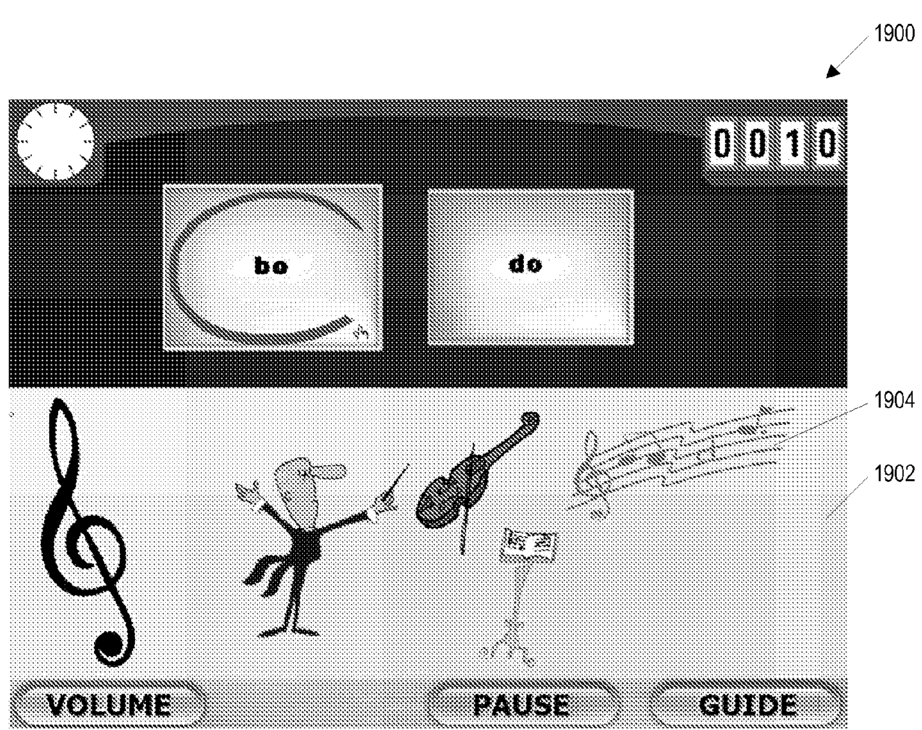
FIG. 19 is a screen shot within the exercise Tell us Apart illustrating an alternative progress indicator within the graphical award portion of the screen.

Referring to FIG. 19, a screen shot 1900 is shown, particularly illustrating a graphical reward portion 1902 that places a FIG. 1904 into the graphical reward portion 1902 upon completion of each trial. After a given number of trials, a reward animation is presented, as in the exercise High or Low, utilizing the FIG. 1904 presented over the course of a number of trials. A complete description of advancement through the exercise Tell us Apart, including a description of the various processing levels used within the exercise is provided in Appendix B.

Match It

Goals of the exercise Match It! include: 1) exposing the auditory system to substantial numbers of consonant-vowel-consonant syllables that have been processed to emphasize and stretch rapid frequency transitions; and 2) driving improvements in working memory by requiring participants to store and use such syllable information in auditory working memory. This is done by using a spatial match task similar to the game "Concentration", in which participants must remember the auditory information over short periods of time to identify matching syllables across a spatial grid of syllables.

Match It! has only one Task, but utilizes 5 speech processing levels. Processing level 1 is the most processed and processing level 5 is normal speech. Participants move through stages within a processing level before moving to a less processed speech level. Stages are characterized by the size of the spatial grid. At each stage, participants complete all the categories. The task is a spatial paired match task. Participants see an array of response buttons. Each response button is associated with a specific syllable (e.g., "big", "tag"), and each syllable is associated with a pair of response buttons. Upon pressing a button, the participant hears the syllable associated with that response button. If the participant presses two response buttons associated with identical syllables consecutively, those response buttons are removed from the game. The participant completes a trial when they have removed all response buttons from the game. Generally, a participant completes the task by clicking on various response buttons to build a spatial map of which buttons are associated with which syllables, and concurrently begins to click consecutive pairs of responses that they believe, based on their evolving spatial map, are associated with identical syllables. The task is made more difficult by increasing the number of response buttons and manipulating the level of speech processing the syllables receive.

Stages: There are 4 task stages, each associated with a specific number of response buttons in the trial and a maximum number of response clicks allowed:

| Stage | Number of Response Buttons | Maximum Number of Clicks (max clicks) |
|---|---|---|
| 1 | 8 (4 pairs) | 20 |
| 2 | 16 (8 pairs) | 60 |
| 3 | 24 (12 pairs) | 120 |
| 4 | 30 (15 pairs) | 150 |

Categories: The stimuli consist of consonant-vowel-consonant syllables or single phonemes:

| Category 1 | Category 2 | Category 3 | Category 4 | Category 5 |
|---|---|---|---|---|
| baa | fig | big | buck | back |
| do | rib | bit | bud | bag |
| gi | sit | dig | but | bat |
| pu | kiss | dip | cup | cab |
| te | bill | kick | cut | cap |
| ka | dish | kid | duck | cat |
| laa | nut | kit | dug | gap |
| ro | chuck | pick | pug | pack |
| sa | rug | pig | pup | pat |
| stu | dust | pit | tub | tack |
| ze | pun | tick | tuck | tag |
| sho | gum | tip | tug | tap |
| chi | bash | bid | bug | gab |
| vaa | can | did | cud | gag |
| fo | gash | pip | puck | bad |
| ma | mat | gib | dud | tab |
| nu | lab | tig | gut | tad |
| the | nag | gig | guck | pad |

Category 1 consists of easily discriminable CV pairs. Leading consonants are chosen from those used in the exercise Tell us Apart and trailing vowels are chosen to make confusable leading consonants as easy to discriminate as possible. Category 2 consists of easily discriminable CVC syllables. Stop, fricative, and nasal consonants are used, and consonants and vowels are placed to minimize the number of confusable CVC pairs. Categories 3, 4, and 5 consist of difficult to discriminate CVC syllables. All consonants are stop consonants, and consonants and vowels are placed to maximize the number of confusable CVC syllables (e.g., cab/cap).

Figure 20:
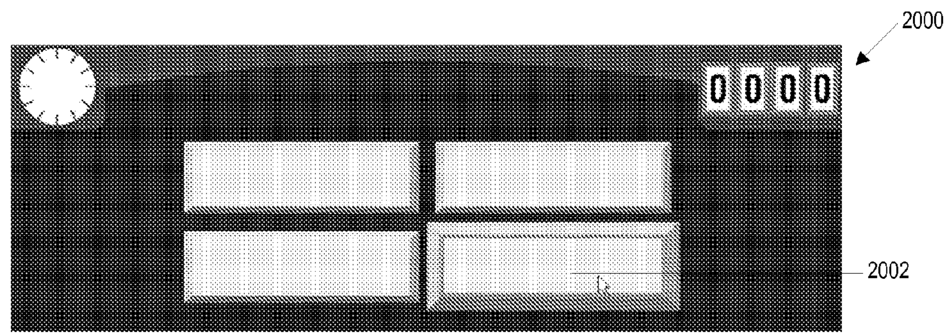
FIG. 20 is a screen shot of a trial within the exercise Match It.

Referring now to FIG. 20, a screen shot 2000 is shown of a trial within the exercise Match It! That is, after the participant selects the start button to begin a trial, they are presented initially with four buttons 2002 for selection. As they move the cursor over a button 2002, it is highlighted. When they select a button 2002, a stimuli is presented. Consecutive selection of two buttons 2002 that have the same stimuli results in the two buttons being removed from the grid.

Figure 21:
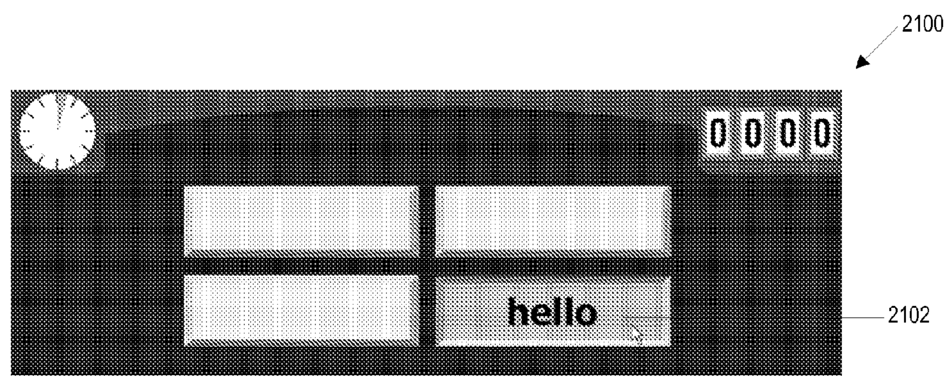
FIG. 21 is a screen shot of a trial within the exercise Match It particularly illustrating selection of one of the available icons.

Referring now to FIG. 21, a screen shot 2100 is shown. This screen occurs during an initial training session after the participant has selected a button. During training, the word (or stimuli) associated with the selected button 2102 is presented both aurally and graphically to the participant. However, after training has ended, the stimuli is presented aurally only.

Figure 22:
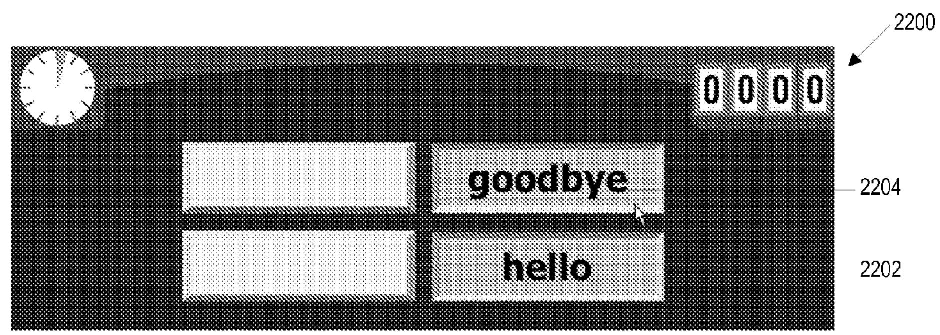
FIG. 22 is a screen shot within the exercise Match It illustrating sequential selection of two of the available icons during an initial training portion of the exercise.

Referring now to FIG. 22, a screen shot 2200 is shown. This shot particularly illustrates that button selections are made in pairs. That is, a first selection is made to button 2202, associated with the stimuli "hello". This selection is held until a selection is made to the second button 2204, associated with the stimuli "goodbye". Since the consecutively selected buttons 2202 and 2204 were not associated with the same stimuli, the buttons will remain on the grid, and will be covered to hide the stimuli.

Figure 23:
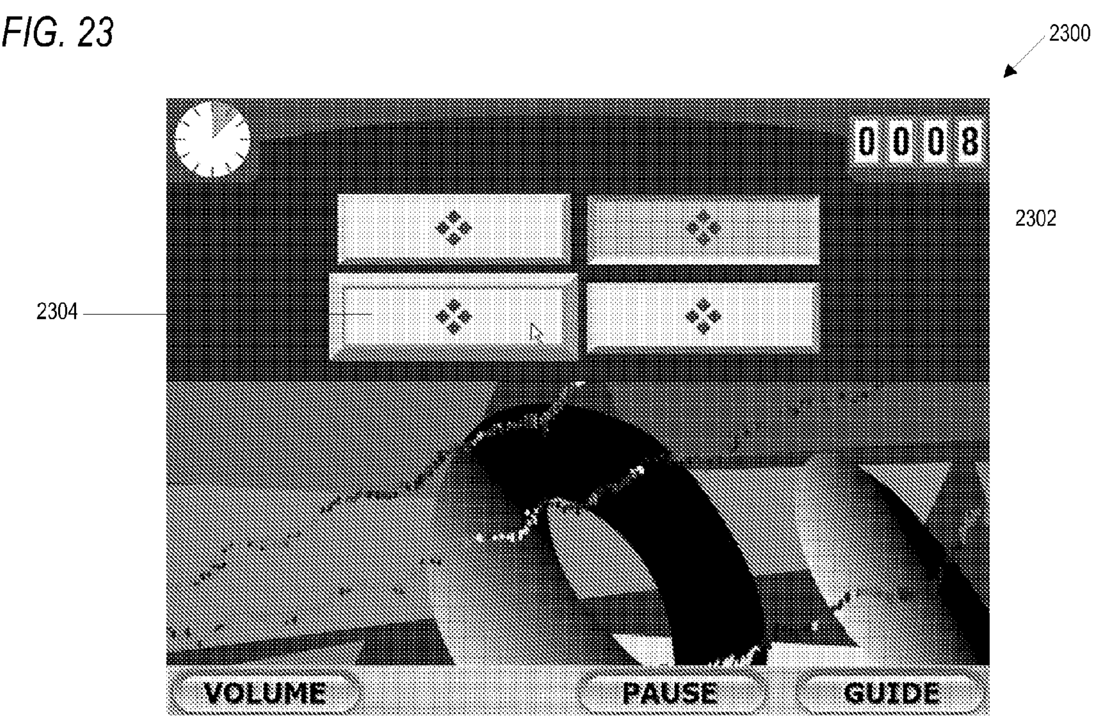
FIG. 23 is a screen shot within the exercise Match It illustrating sequential selection of two of the available icons.

Referring now to FIG. 23, a screen shot 2300 is shown. This screen 2300 shows two consecutively selected buttons 2302 and 2304, as in FIG. 2200. However, this screen 2300 particularly illustrates that the stimuli associated with these buttons 2302 and 2304 are presented aurally only, but not graphically.

Figure 24:
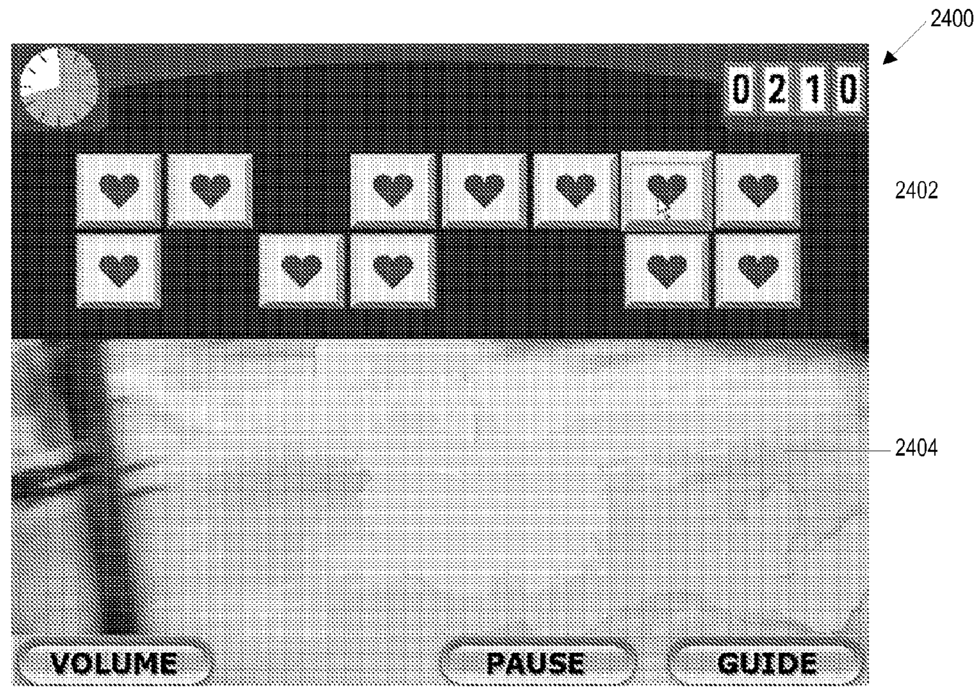
FIG. 24 is a screen shot within the exercise Match It illustrating an advanced training level having 16 buttons.

Referring now to FIG. 24, a screen shot 2400 is shown. This screen 2400 particularly illustrates a 16 button 2402 grid, presented to the participant during a more advanced stage of training than shown above with respect to FIGS. 20-23. Furthermore, what is shown is the beginning traces of a picture in the graphical reward portion 2404, as described above. One skilled in the art will appreciate that as the participant advances through the various levels in the exercise, the number of buttons provided to the participant also increases. For a complete description of flow through the processing levels, please see Appendix C.

Sound Replay

Applicants believe that We degraded representational fidelity of the auditory system in older adults causes an additional difficulty in the ability of older adults to store and use information in auditory working memory. This deficit manifests itself psychophysically in the participant's poor ability to perform working memory tasks using stimuli presented in the auditory modality. The goals of this exercise therefore include: 1) To expose the participant's auditory system to substantial numbers of consonant-vowel-consonant syllables that have been processed to emphasize and stretch the rapid frequency transitions; and 2) To drive improvements in working memory by requiring participants to store and use such syllable information in auditory working memory. These goals are met using a temporal match task similar to the neuropsychological tasks digit span and digit span backwards, in which participants must remember the auditory information over short periods of time to identify matching syllables in a temporal stream of syllables.

Sound Replay has a Main Task and Bonus Task. The stimuli are identical across the two Tasks in Sound Replay. In one embodiment, the stimuli used in Sound Replay is identical to that used in Match It. There are 5 speech processing levels. Processing level 1 is the most processed and processing level 5 is normal speech. Participants move through stages within a processing level before moving to a less processed speech level. At each stage, participants complete all categories.

A task is a temporal paired match trial. Participants hear a sequence of processed syllables (e.g., "big", "tag", "pat"). Following the presentation of the sequence, the participant sees a number of response buttons, each labeled with a syllable. All syllables in the sequence are shown, and there may be buttons labeled with syllables not present in the sequence (distracters). The participant is required to press the response buttons to reconstruct the sequence. The Task is made more difficult by increasing the length of the sequence, decreasing the ISI, and manipulating the level of speech processing the syllables receive. A complete description of the flow through the various stimuli and processing levels is found in Appendix D.

Figure 25:
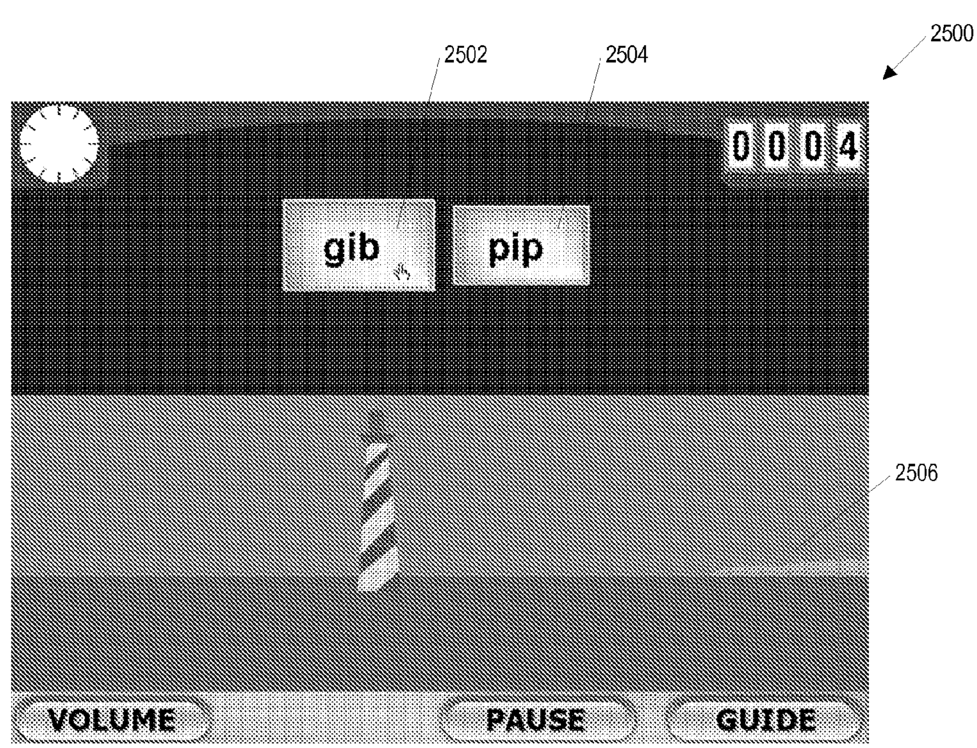
FIG. 25 is a screen shot within the exercise Sound Replay illustrating two icons for order association with aurally presented phonemes.

Referring now to FIG. 25, a screen shot 2500 is shown which illustrates a trial within the exercise Sound Replay. More specifically, after the participant selects the start button, two or more processed stimuli are aurally presented, in a particular order. Subsequent to the aural presentation, two or more graphical representations 2502, 2504 of the stimuli are presented. In one embodiment, distracter icons may also be presented to make the task more difficult for the participant. The participant is required to select the icons 2502, 2504 in the order in which they were aurally presented. Thus, if the aural presentation were "gib", "pip", the participant should select icon 2502 followed by selection of icon 2504. If the participant correctly responds to the trial, a "ding" is played, and the score indicator increments. Then, the graphical award portion 2506 traces a portion of a picture, as above. If the participant does not indicate the correct sequence, a "thunk" is played, and the correct response is illustrated to the participant by highlighting the icons 2502, 2504 according to their order of aural presentation.

Figure 26:
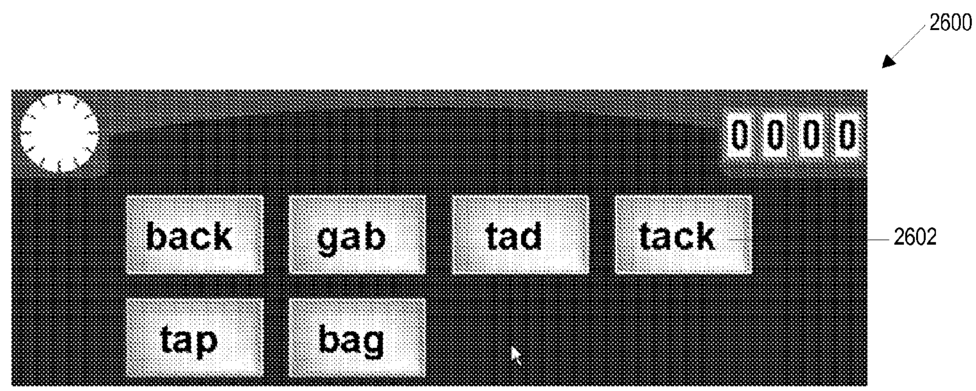
FIG. 26 is a screen shot within the exercise Sound Replay illustrating six icons for order association with two or more aurally presented phonemes.

Referring now to FIG. 26, a screen shot is shown of a more advanced level of training within the exercise Sound Replay. In this instance, six buttons 2602 are presented to the participant after aural presentation of a sequence. The participant is required to select the buttons 2602 according to the order presented in the aural sequence. As mentioned above, if they are incorrect in their selection of the buttons 2602, Sound Replay provides an onscreen illustration to show the correct order of selection of the buttons by highlighting the buttons 2602 according to the order of aural presentation.

Listen and Do

Applicants believe that a degraded representational fidelity of the auditory system in older adults causes an additional difficulty in the ability of older adults to store and use information in auditory working memory. This deficit manifests itself behaviorally in the subject's poor ability to understand and follow a sequence of verbal instructions to perform a complex behavioral task. Therefore, goals of the exercise Listen and Do include: 1) exposing the auditory system to a substantial amount of speech that has been processed to emphasize and stretch the rapid frequency transitions; and 2) driving improvements in speech comprehension and working memory by requiring participants to store and use such speech information. In this task, the participant is given auditory instructions of increasing length and complexity.

The task requires the subject to listen to, understand, and then follow an auditory instruction or sequence of instructions by manipulating various objects on the screen. Participants hear a sequence of instructions (e.g., "click on the bank" or "move the girl in the red dress to the toy store and then move the small dog to the tree"). Following the presentation of the instruction sequence, the participant performs the requested actions. The task is made more difficult by making the instruction sequence contain more steps (e.g., "click on the bus and then click on the bus stop"), by increasing the complexity of the object descriptors (i.e., specifying adjectives and prepositions), and manipulating the level of speech processing the instruction sequence receives. A complete description of the flow through the processing levels in the exercise Listen and Do is found in Appendix E.

Figure 27:
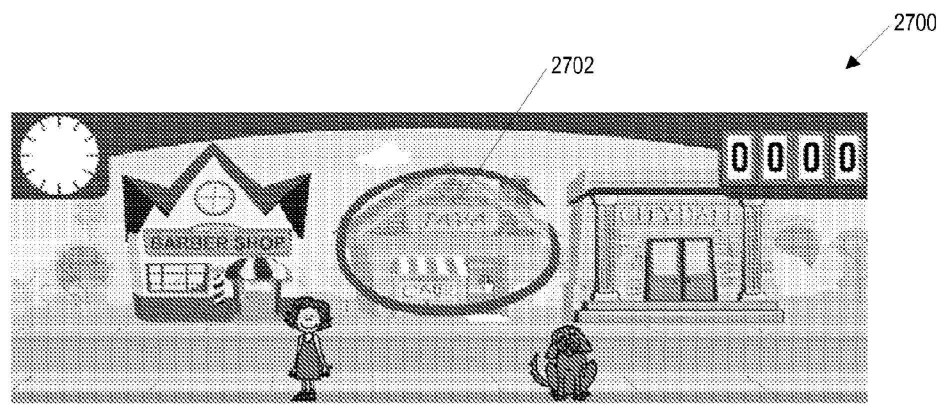
FIG. 27 is a screen shot within the exercise Listen and Do illustrating an initial training module of the exercise.

Referring now to FIG. 27, a screen shot 2700 is shown during an initial training portion of the exercise Listen and Do. This screen occurs after the participant selects the start button. An auditory message prompts the participant to click on the café 2702. Then, the café 2702 is highlighted in red to show the participant what item on the screen they are to select. Correct selection causes a "ding" to be played, and increments the score indicator. Incorrect selection causes "thunk" to be played. The participant is provided several examples during the training portion so that they can understand the items that they are select. Once the training portion is successfully completed, they are taken to a normal training exercise, where trials of processed speech are presented.

Figures 28, 29:
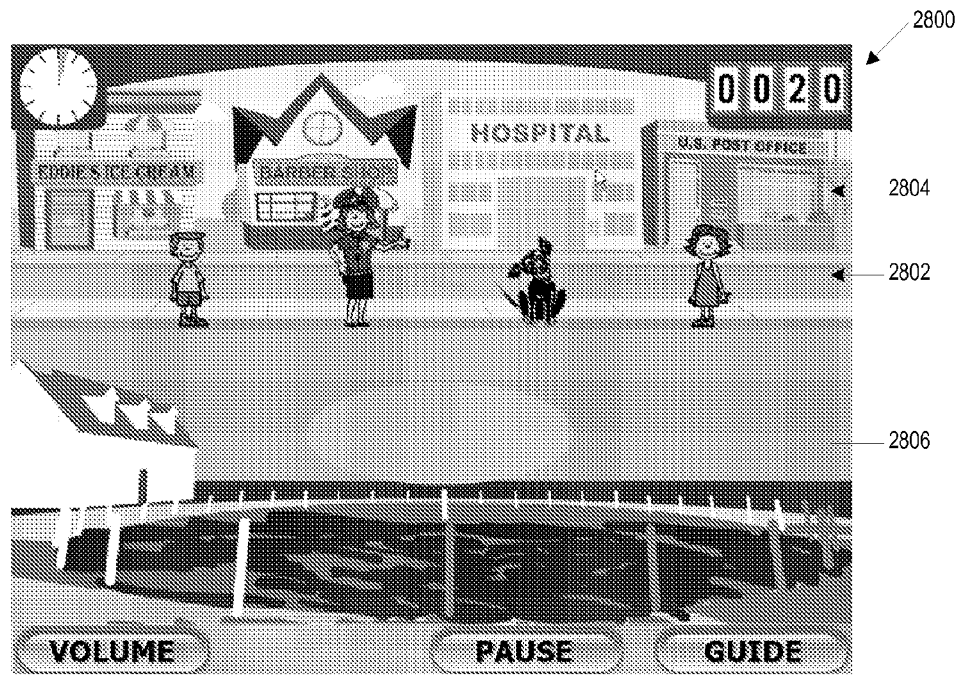
FIG. 28 is a screen shot within the exercise Listen and Do illustrating a moderately complex scene for testing.
FIG. 29 is a screen shot within the exercise Listen and Do illustrating a complex scene for testing.

Referring now to FIG. 28, a screen shot 2800 is shown during a trial within the Listen and Do exercise. In this trial, there are 4 characters 2802 and 4 locations 2804 that may be used to test the participant. Further, as in the other exercises, a graphical reward portion 2806 is provided to show progress within the exercise.

Referring now to FIG. 29, a screen shot 2900 is shown during a more advanced training level within the exercise Listen and Do. In this screen 2900 there are 7 characters 2902 and 4 locations 2904 to allow for more complex constructs of commands. A complete list of the syntax for building commands, and the list of available characters and locations for the commands are found in Appendix E.

Story Teller

Applicants believe that the degraded representational fidelity of the auditory system in older adults causes an additional difficulty in the ability of older adults to store and use information in auditory working memory. This deficit manifests itself behaviorally in the participant's poor ability to remember verbally presented information. Therefore applicants have at least the following goals for the exercise Story Teller: 1) to expose the participant's auditory system to a substantial amount of speech that has been processed to emphasize and stretch the rapid frequency transitions; and 2) to drive improvements in speech comprehension and working memory by requiring participants to store and recall verbally presented information. This is done using a story recall task, in which the participant must store relevant facts from a verbally presented story and then recall them later. In this task, the participant is presented with auditory stories of increasing length and complexity. Following the presentation, the participant must answer specific questions about the content of the story.

The task requires the participant to listen to an auditory story segment, and then recall specific details of the story. Following the presentation of a story segment, the participant is asked several questions about the factual content of the story. The participant responds by clicking on response buttons featuring either pictures or words. For example, if the story segment refers to a boy in a blue hat, a question might be: "What color is the boy's hat?" and each response button might feature a boy in a different color hat or words for different colors. The task is made more difficult by 1) increasing the number of story segments heard before responding to questions 2) making the stories more complex (e.g., longer, more key items, more complex descriptive elements, and increased grammatical complexity) and 3) manipulating the level of speech processing of the stories and questions. A description of the process for Story Teller, along with a copy of the stories and the stimuli is found in Appendix F.

Figure 30:
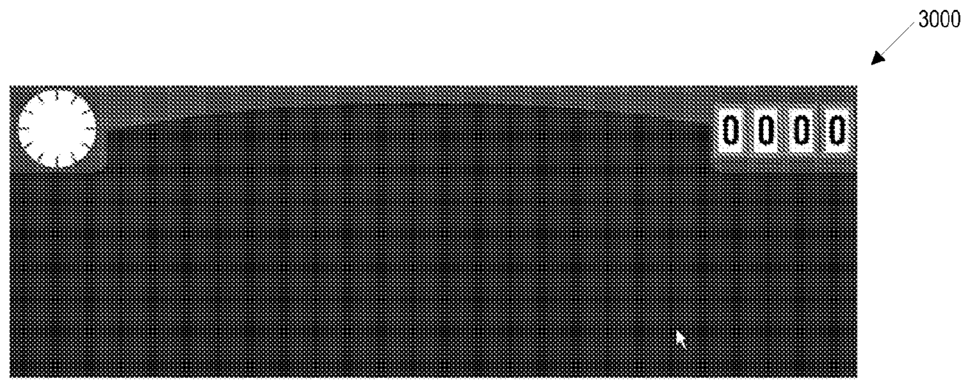
FIG. 30 is a screen shot within the exercise Story Teller illustrating an initial training module of the exercise.

Referring now to FIG. 30, a screen shot 3000 is shown of an initial training screen within the exercise Story Teller. After the participant selects a start button, a segment of a story is aurally presented to the participant using processed speech. Once the segment is presented, the start button appears again. The participant then selects the start button to be presented with questions relating to the story.

Figure 31:
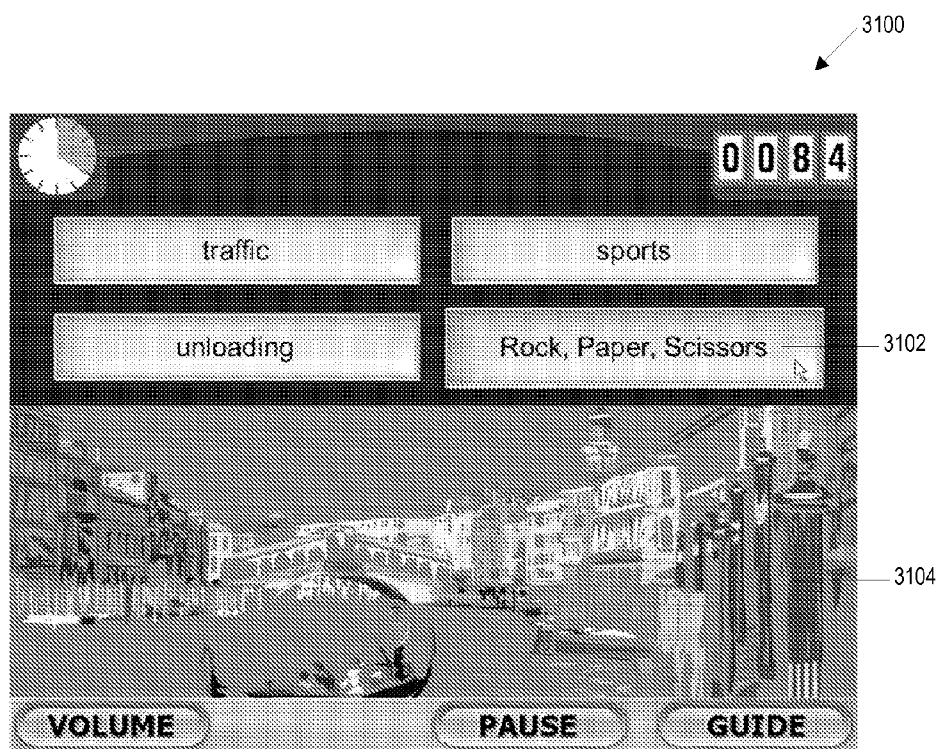
FIG. 31 is a screen shot within the exercise Story Teller illustrating textual response possibilities to a question.
Figure 32:
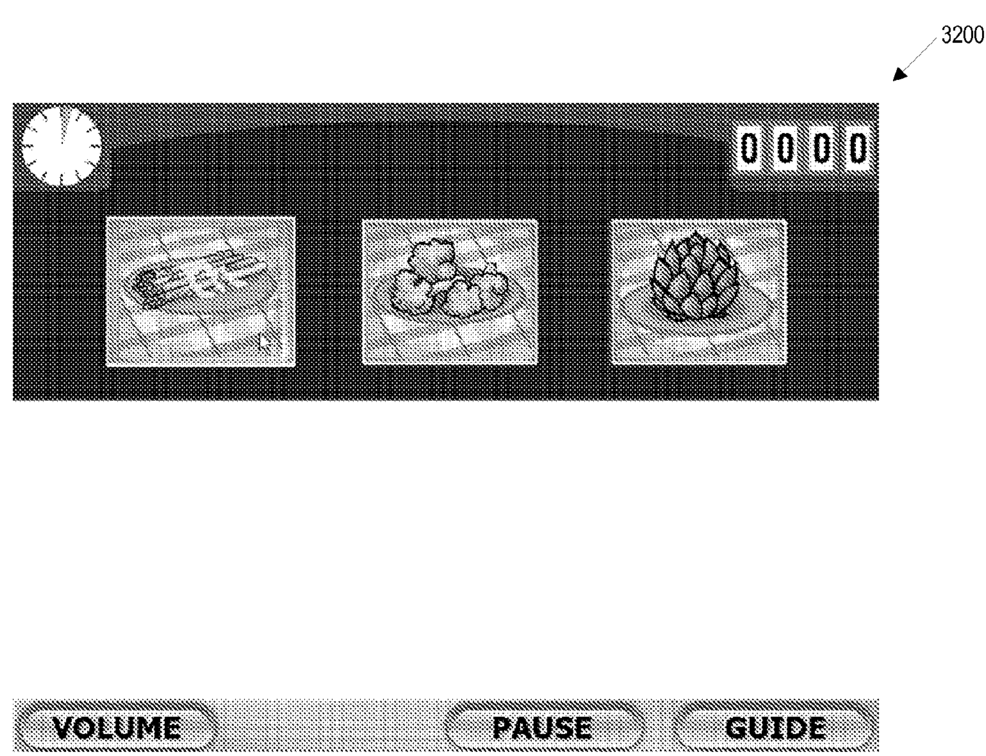
FIG. 32 is a screen shot within the exercise Story Teller illustrating graphical response possibilities to a question.

Referring now to FIG. 31, a screen shot 3100 is shown of icons 3102 that are possible answers to an aurally presented question. In one embodiment, the aurally presented questions are processed speech, using the same processing parameters used when the story was presented. In some instances, the icons are in text format, as in FIG. 31. In other instances, the icons are in picture format, as in FIG. 32. In either instance, the participant is required to select the icon that best answers the aurally presented question. If they indicate a correct response, a "ding" is played, the score indicator is incremented, and the graphical reward portion 3104 is updated, as above. If they indicate an incorrect response, a "thunk" is played.

Acoustic Processing of Stimuli

As noted above, in exercises where participants are expected to identify rapid spectro-temporal patterns (brief synthesized formant transitions), such as embodiments of the Tell Us Apart Exercise described above, the fact that formant frequencies constitute only a (comparatively informative) subset of the range of acoustic cues that accompany human productions of the consonants, may cause sounds synthesized in this way to not closely resemble natural speech in a general sense, and as a result, many participants may be unable to match these synthesized sounds, presented in isolation, with the intended syllables based on their previous linguistic experience, and may therefore be unable to progress through the easiest levels of the exercise, which almost certainly involve sound distinctions that are well above their actual thresholds for detection. Thus, in exercises that use synthesized speech to target specific neurological deficits, the effectiveness of a task may be limited by the overall naturalness of the speech stimuli, since it is often necessary to reduce the acoustic cues available to the listener to a small, carefully controlled set.

However, evidence suggests that it is possible to modulate a listener's attention toward specific acoustic cues in a speech signal over the course of short training sessions. Thus, in some embodiments, e.g., for an introductory set of stimuli, e.g., in a training session or series of training sessions, the listener may be exposed first to complex, pseudo-natural versions of the targeted syllables and then, over multiple exposures to the stimuli, the sounds may be progressively mixed or blended with the simpler formant-synthesized versions, until, in the later exposures to the stimuli, the resulting stimuli (phonemes) are primarily or even entirely composed of the formant-synthesized versions. In other words, over the course of multiple exposures, the aurally presented phoneme may be "morphed" from predominately or entirely natural sounding (or at least substantially naturally sounding) to predominately or entirely formant-synthesized, thus training the participant (the aging adult) to more easily recognize the acoustic cues relevant to synthetic speech distinction.

Figure 33:
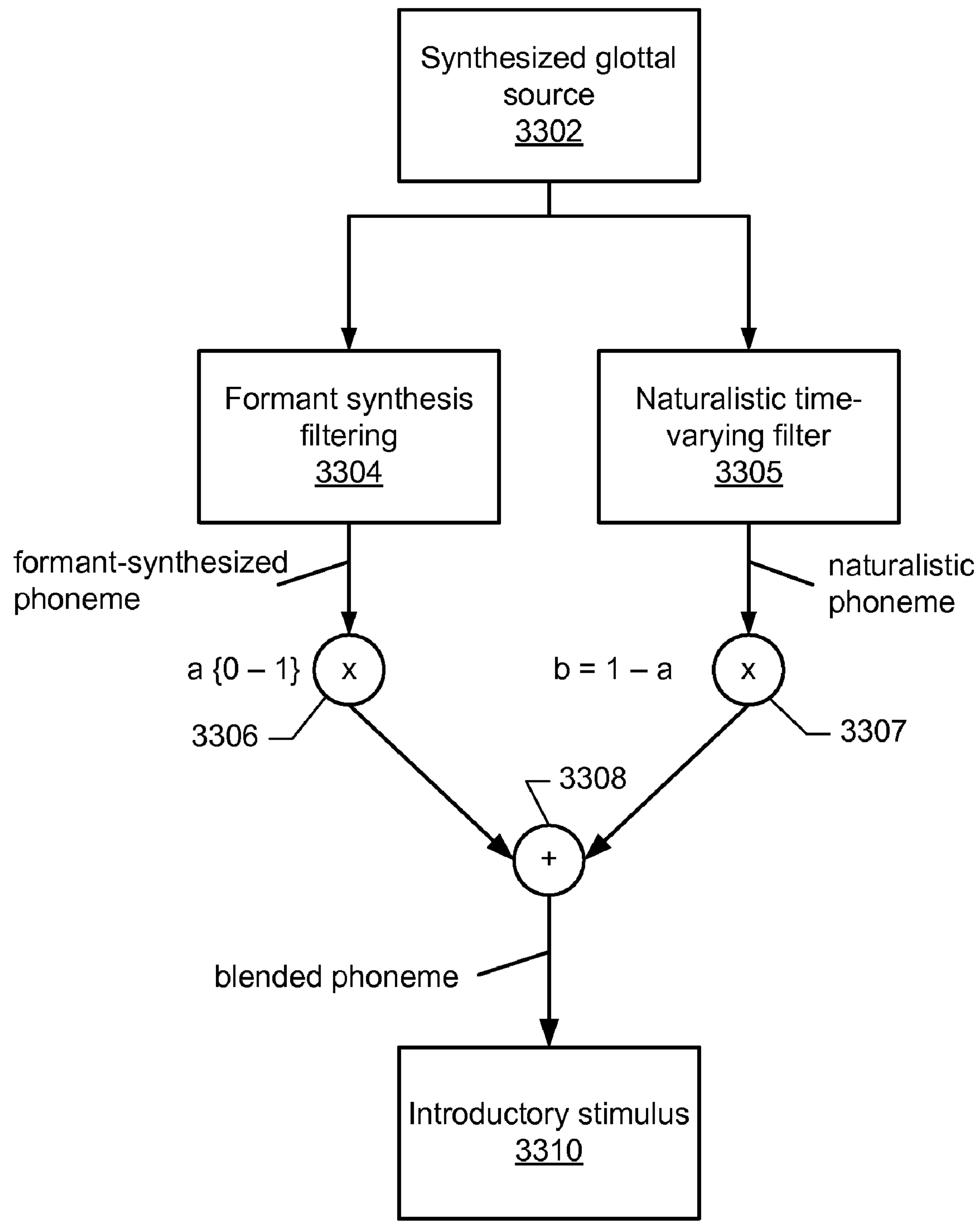
FIG. 33 illustrates blending of naturalistic cues with synthesized formants in presentation stimuli.

Referring now to FIG. 33, one embodiments of a method is shown for blending of naturalistic cues with synthesized formants in presentation stimuli. As FIG. 33 indicates, in 3302, a glottal source may be synthesized, e.g., via a computer-based algorithm, i.e., synthesizer, thereby generating a synthesized or modeled glottal source, referred to herein as simply the "glottal source". For example, the same synthesizer or algorithm used to produce the synthetically generated phonemes described with respect to the Tell Us Apart exercise above may be used to synthesize the source.

Note that in general, synthesized phonemes are based on modulation of a glottal source, e.g., a quasi-periodic signal that resembles the output of vibrating vocal folds that is modulated to produce the phoneme. For example, in human speech, the glottal source is processed by the resonant properties of the upper vocal tract, and in the synthesized case, by either a series of time-varying formant filters or a more naturalistic time-varying filter derived from linear prediction analysis of a recorded sound, to 'create' phonemes.

Thus, as FIG. 33 shows, in 3304, one version of the synthesized glottal source may be formant-synthesis filtered to generate a synthesized phoneme, where formants are the distinguishing frequency components of human speech (or any other acoustical apparatus). For example, the filter may include formant resonators that operate to amplify characteristic formants in the source, i.e., peaks in the acoustic frequency spectrum resulting from resonances of the (synthesized) vocal apparatus in forming the phoneme. Filtering the synthesized source with formant resonators may thus produce a formant-synthesized phoneme.

In 3305, another version or copy of the synthesized glottal source, specifically, one that has not been filtered by the synthesizer's formant resonators, may be processed using a naturalistic time-varying filter to produce another version of the phoneme. For example, in preferred embodiments, the time-varying filter may be derived by autocorrelation linear predictive coding analysis of a natural production of the same syllable or phoneme that is carefully produced and selected to match the spectro-temporal properties of the target phoneme as closely as possible. Such filtering may result in a naturalistic phoneme that is an imperfect replication of the natural production of the phoneme, but that is sufficiently close to facilitate recognition by listeners who may have trouble identifying the purely synthetic sounds, such as the formant-synthesized phoneme of 3304. In other words, the filter preferably substantially matches the spectro-temporal properties of the natural production of the phoneme, and the naturalistic phoneme at least partially replicates the natural production of the phoneme.

Thus, two versions of the synthesized phoneme may be produced—a formant-synthesized phoneme, and a naturalistic phoneme that has more natural sounding attributes. Note that each phoneme is or includes a respective waveform, which, as is well known in the art, may be further manipulated as desired, e.g., the waveforms may be attenuated or scaled.

In 3306 and 3307, the formant-synthesized phoneme, and the naturalistic phoneme may be multiplied by respective coefficients or weighting factors, as indicated. More specifically, in 3306, the wave form of the formant-synthesized phoneme may be multiplied by a first coefficient, e.g., coefficient a, which in this embodiment ranges from 0 to 1, and the naturalistic phoneme may be multiplied by a second coefficient, e.g., coefficient b, which, in this embodiment, is equal to $1-a$. As may be seen, since $a+b=1$, as a ranges from 0 to 1, b ranges from 1 to 0, i.e., as a increases, b decreases.

Note that because the pitch and (as far as possible) the relevant spectral characteristics of the naturalistic phoneme are substantially synchronous with those of the synthesized version, the two waveforms can be combined additively without serious artifacts. Thus, in 3308, the weighted phonemes, i.e., the attenuated waveforms of the phonemes, may be added together, resulting in a blended phoneme, which may then be presented to the user as an introductory stimulus, as shown in 3310. Said another way, a weighted sum of the formant-synthesized phoneme and the naturalistic phoneme may be generated.

Each phoneme of at least a subset of the plurality of confusable pairs of phonemes (see the description of the Tell Us Apart exercise above) may be created and manipulated as described above to generate a respective blended phoneme, where the coefficients or weighting factors may be progressively tuned such that initially the blend is primarily or entirely the more natural sounding naturalistic phoneme, and, over the course of multiple exposures, the coefficients may be modified to increase the strength or amplitude of the formant-synthesized phoneme and decrease that of the naturalistic phoneme, until the formant-synthesized phoneme dominates the blend, and possibly entirely constitutes the presented phoneme. This may have the effect of allowing the stylized formant transitions (of the formant-synthesized phoneme) first to co-occur with the more familiar sets of cues (of the naturalistic phoneme) and eventually to dominate the stimulus signals, in general serving to highlight the systematic similarities of these sounds to their more natural counterparts. The participant, i.e., the aging adult, may thus be trained to respond to the synthetic formant cues by gradually progressing from the (primarily) natural sounding version of the phoneme to the (primarily) formant-synthesized version of the phoneme.

This type of acoustic processing of the phonemes may be used with respect to a set of introductory stimuli in exercises such as the Tell Us Apart exercise described above, after which standard synthetic phoneme stimuli may be used, as described above.

Although the present invention and its objects, features, and advantages have been described in detail, other embodiments are encompassed by the invention. For example, particular advancement/promotion methodology has been thoroughly illustrated and described for each exercise. The methodology for advancement of each exercise is based on studies indicating the need for frequency, intensity, motivation and cross-training. However, the number of skill/complexity levels provided for in each game, the number of trials for each level, and the percentage of correct responses required within the methodology are not static. Rather, they change, based on heuristic information, as more participants utilize the HiFi training program. Therefore, modifications to advancement/progression methodology is anticipated. In addition, one skilled in the art will appreciate that the stimuli used for training, as detailed in the Appendices, are merely a subset of stimuli that can be used within a training environment similar to HiFi. Furthermore, although the characters, and settings of the exercises are entertaining, and therefore motivational to a participant, other storylines can be developed which would utilize the unique training methodologies described herein.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. In a computer-implemented auditory training exercise for improving a person's acoustic processing abilities, wherein the auditory training exercise adaptively modifies a stimulus level of synthesized phonemes in an iterative manner based on the person's responses to those synthesized phonemes, wherein the stimulus level is characterized by one or more of the degree by which selected portions of the synthesized phonemes are made relatively more or less loud and the degree by which selected segments of the synthesized phonemes are temporally stretched, a method of progressively orienting the person to recognize a synthesized phoneme that consists essentially only of a formant-filtered representation of the phoneme, the method comprising:

providing a first, relatively simplified representation of a phoneme, the first representation consisting of a formant-synthesized-filtered representation of the phoneme;

providing a second relatively more spectrally complete representation of the phoneme thru synthesis using a naturalistic time-varying filter;

blending different proportions of the first and second representations of the phoneme into different blended representations of the phoneme ranging from a most naturally-sounding representation of the phoneme to a least naturally-sounding representation of the phoneme;

initially aurally presenting the most naturally-sounding representation of the phoneme to the person; and aurally presenting progressively less-naturally sounding representations of the phoneme to the person;

wherein the auditory training exercise is implemented after the person completes the orientation.

2. The method as recited in claim 1, wherein the first and second representations of the phoneme are computer generated by:

synthesizing a glottal source for the phoneme;

filtering the synthesized glottal source with formant resonators to produce the first representation of the phoneme; and processing the synthesized glottal source with a time-varying filter to produce the second, relatively more spectrally complete representation of the phoneme, wherein the time-varying filter substantially matches the spectro-temporal properties of a natural production of the phoneme, and wherein the second representation of the phoneme at least partially replicates natural production of the phoneme.

3. The method as recited in claim 2, wherein the time-varying filter is derived by autocorrelation of linear predictive coding (LPC) of the natural production of the phoneme.

4. The method as recited in claim 2, wherein a blended representation of the phoneme is generated by:

multiplying waveforms of the first representation of the phoneme and the second representation of the phoneme by respective coefficients to generate a weighted simplified phoneme waveform and a weighted complex waveform; and adding the weighted simplified phoneme waveform and the weighted complex phoneme waveform to generate the blended representation.

5. The method as recited in claim 4, wherein additional blended representations of the phoneme are generated by:

progressively modifying the respective coefficients to generate blended representations of the phoneme comprising progressively larger proportions of the first, relatively simplified representation of the phoneme.

6. The method as recited in claim 2, wherein the term "computer generated" indicates that the phonemes are generated algorithmically by the computing device rather than simply processing recorded speech.

7. The method as recited in claim 1, wherein the computer-implemented auditory training exercise presents confusable pairs of phonemes that are selected to train the person across a spectrum of articulation points.

8. The method as recited in claim 7, wherein the spectrum of articulation points includes back of throat, tongue and pallet, and lip generated consonants.

9. The method as recited in claim 7, wherein the confusable pairs of phonemes are selected to train across a frequency spectrum of vowels.

10. The method as recited in claim 1, wherein the stimulus level is characterized by the relative loudness of consonant and vowel portions of the synthesized phonemes.

11. The method as recited in claim 1, wherein the stimulus level is characterized by a length of a gap between consonant and vowel portions of the synthesized phonemes.

12. The method as recited in claim 1, wherein the stimulus level is characterized by an amount of temporal stretch of a consonant portion of the synthesized phonemes.

13. The method as recited in claim 1, wherein a plurality of stimulus levels of synthesized phonemes are presented, including:

stimulus levels which vary the relative loudness of consonant and vowel portions of the phonemes; and stimulus levels which stretch a consonant portion of the phonemes.

14. The method as recited in claim 1, wherein the computer-implemented auditory training exercise presents confusable pairs of synthesized phonemes, presented over a range of stimulus levels selected to make discriminating between the phonemes more or less difficult.

15. The method as recited in claim 1, wherein the computer-implemented auditory training exercise presents aural representations of synthesized phonemes and selectable icons comprising visual representations of the phonemes on a computing device.

16. The method as recited in claim 1, wherein the computer-implemented auditory training exercise presents aural representations of synthesized phonemes over a plurality of stimulus levels, including a stimulus level which assists the person in discriminating between consonant and vowel portions of the one of the phonemes being aurally presented.

17. The method as recited in claim 1, wherein the computer-implemented auditory training exercise presents aural representations of synthesized phonemes over a plurality of stimulus levels, including a stimulus level that emphasizes and stretches both consonant and vowel portions of one of the phonemes.

18. The method as recited in claim 1, wherein the computer-implemented auditory training exercise receives responses from the person to the synthesized phonemes represented by selection of a selection tool over one of a plurality of selectable icons graphically representing a plurality of phonemes.

19. The method as recited in claim 18, wherein the selection is made by clicking a button on a computer mouse.

20. The method as recited in claim 1, wherein the computer-implemented auditory training exercise, after detecting a correct response, presents a synthesized phoneme with a stimulus level that has less emphasis.

21. The method as recited in claim 1, wherein the computer-implemented auditory training exercise, after detecting a correct response, presents a synthesized phoneme with a stimulus level that has less stretching.

22. The method as recited in claim 1, wherein the computer-implemented auditory training exercise, after detecting an incorrect response, presents a synthesized phoneme with a stimulus level that has greater emphasis.

23. The method as recited in claim 1, wherein the computer-implemented auditory training exercise, after detecting an incorrect response, presents a synthesized phoneme with a stimulus level that has greater stretching.

24. In a computer-implemented auditory training exercise for improving a person's acoustic processing abilities, wherein the auditory training exercise aurally presents a plurality of confusable pairs of synthesized phonemes, at a plurality of stimulus levels, to the person and challenges the person to make consonant and vowel discriminations under conditions of forward and backward masking from adjacent vowels and consonants, a method of progressively orienting the person to recognize a synthesized phoneme that consists essentially only of formants of the phoneme, the method comprising:

generating a relatively simple, formant synthesized representation of a phoneme, the formant-synthesized representation consisting essentially only of formants of the phoneme;

generating a relatively more naturalistic representation of the phoneme thru synthesis using a naturalistic time-varying filter;

blending different proportions of the formant-synthesized and relatively more naturalistic auditory representations of the phoneme into different blended representations of the phoneme ranging from a most naturally-sounding representation of the phoneme to a least naturally-sounding representation of the phoneme;

initially aurally presenting the most naturally-sounding representation of the phoneme to the person; and aurally presenting progressively less-naturally sounding representations of the phoneme to the person;

wherein the auditory training exercise is implemented after the person completes the orientation.

25. The method as recited in claim 24, wherein the format synthesized and naturalistic representations of the phonemes are computer generated by:

synthesizing a glottal source for the phoneme;

filtering the synthesized glottal source with formant resonators to produce the formant-synthesized phoneme; and processing the synthesized glottal source with a time-varying filter to produce the naturalistic phoneme, wherein the time-varying filter substantially matches the spectro-temporal properties of a natural production of the phoneme, and wherein the naturalistic phoneme at least partially replicates the natural production of the phoneme.

26. The method as recited in claim 25, wherein the time-varying filter is derived by autocorrelation of linear predictive coding (LPC) of the natural production of the phoneme.

27. A non-transitory computer-readable memory medium that stores executable program instructions for an auditory training exercise for improving a person's acoustic processing abilities, wherein the auditory training exercise aurally adaptively presents synthesized phonemes, at a plurality of stimulus levels, to the person, the medium also storing executable program instructions for a pre-training session to progressively orient the person to recognize a synthesized phoneme that consists essentially only of a formant-filtered representation of the phoneme, wherein the program instructions are executable to:

generate a relatively simple, formant synthesized representation of a phoneme, the formant-synthesized representation consisting essentially only of a formant-filtered representation of the phoneme;

generate a relatively more naturalistic representation of the phoneme thru synthesis using a naturalistic time-varying filter;

blend different proportions of the formant-synthesized and relatively more naturalistic auditory representations of the phoneme into different blended representations of the phoneme ranging from a most naturally-sounding representation of the phoneme to a least naturally-sounding representation of the phoneme;

initially aurally presenting the most naturally-sounding representation of the phoneme to the person; and aurally presenting progressively less-naturally sounding representations of the phoneme to the person;

wherein the auditory training exercise program instructions are executed after the orientation program instructions.

28. The memory medium as recited in claim 27, wherein the format synthesized and naturalistic representations of the phonemes are computer generated by:

synthesizing a glottal source for the phoneme;

filtering the synthesized glottal source with formant resonators to produce the formant-synthesized phoneme; and processing the synthesized glottal source with a time-varying filter to produce the naturalistic phoneme, wherein the time-varying filter substantially matches the spectro-temporal properties of a natural production of the phoneme, and wherein the naturalistic phoneme at least partially replicates the natural production of the phoneme.

29. The method as recited in claim 28, wherein the time-varying filter is derived by autocorrelation of linear predictive coding (LPC) of the natural production of the phoneme.

* * * * *